US006860979B2

(12) United States Patent
Sams

(10) Patent No.: US 6,860,979 B2
(45) Date of Patent: Mar. 1, 2005

(54) DUAL FREQUENCY ELECTROSTATIC COALESCENCE

(75) Inventor: Gary W. Sams, Tulsa, OK (US)

(73) Assignee: National Tank Company, Houston, TX (US)

( * ) Notice: Subject to any disclaimer, the term of this patent is extended or adjusted under 35 U.S.C. 154(b) by 256 days.

(21) Appl. No.: 10/214,295

(22) Filed: Aug. 7, 2002

(65) Prior Publication Data

US 2004/0094421 A1 May 20, 2004

(51) Int. Cl.[7] ................. C10G 33/02; B01D 17/06
(52) U.S. Cl. ............... 204/556; 204/565; 204/573; 204/663
(58) Field of Search ................. 204/554, 556, 204/559, 563, 564, 565, 575, 661, 663

(56) References Cited

U.S. PATENT DOCUMENTS

| | | | |
|---|---|---|---|
| 1,116,299 A | 11/1914 | Laird et al. | |
| 1,276,387 A | 8/1918 | McKibben | |
| 1,838,931 A | * 12/1931 | Fisher | 204/565 |
| 2,120,932 A | 6/1938 | Dillon | 204/24 |
| 2,849,395 A | 8/1958 | Wintermute | 204/305 |
| 3,772,180 A | 11/1973 | Prestridge | 204/305 |
| 3,839,176 A | 10/1974 | McCoy | 204/191 |
| 3,847,775 A | 11/1974 | Prestridge | 204/191 |
| 4,126,537 A | 11/1978 | Prestridge | 204/302 |
| 4,161,439 A | 7/1979 | Warren et al. | 204/306 |
| 4,200,516 A | 4/1980 | Pope | 204/302 |
| 4,204,934 A | 5/1980 | Warren et al. | 204/186 |
| 4,224,124 A | 9/1980 | Pope | 204/186 |
| 4,283,290 A | 8/1981 | Davies | 210/643 |
| 4,290,882 A | 9/1981 | Dempsey | 210/634 |
| 4,308,127 A | 12/1981 | Prestridge | 204/302 |
| 4,400,253 A | 8/1983 | Prestridge | 204/186 |
| 4,415,426 A | 11/1983 | Hsu et al. | 204/290 |
| 4,417,971 A | 11/1983 | Ferrin et al. | 204/305 |
| 4,469,582 A | 9/1984 | Sublette et al. | 204/302 |
| 4,479,161 A | 10/1984 | Henrich et al. | 361/235 |
| 4,581,119 A | 4/1986 | Rajani et al. | 204/302 |
| 4,581,120 A | 4/1986 | Sublette | 204/302 |
| 4,601,834 A | 7/1986 | Bailes et al. | 210/748 |
| 4,606,801 A | 8/1986 | Prestridge et al. | 204/186 |
| 4,702,815 A | 10/1987 | Prestridge et al. | 204/302 |
| 4,747,921 A | 5/1988 | Bailes | 204/186 |
| 4,767,515 A | 8/1988 | Scott et al. | 204/186 |
| 4,804,453 A | 2/1989 | Sublette et al. | 204/302 |
| 5,147,045 A | 9/1992 | Chi et al. | 209/9 |
| 5,411,651 A | 5/1995 | Yamaguchi et al. | 204/186 |
| 5,421,972 A | 6/1995 | Hickey et al. | 204/186 |
| 5,464,522 A | 11/1995 | MacEdmondson | 204/302 |
| 5,543,027 A | 8/1996 | Yamaguchi et al. | 204/660 |
| 5,565,078 A | 10/1996 | Sams et al. | 204/671 |
| 5,575,896 A | 11/1996 | Sams et al. | 204/564 |
| 5,643,431 A | 7/1997 | Sams et al. | 204/564 |
| 5,824,203 A | 10/1998 | Remo | 204/559 |
| 6,010,634 A | 1/2000 | Sams et al. | 210/801 |
| 6,113,765 A | 9/2000 | Wagner et al. | 204/556 |

FOREIGN PATENT DOCUMENTS

GB        1 205 562        6/1966        ............... 11/4

* cited by examiner

Primary Examiner—Roy King
Assistant Examiner—William T. Leader
(74) Attorney, Agent, or Firm—Gable & Gotwals; Paul H. Johnson

(57) ABSTRACT

A method of augmenting the separation of immiscible heavier and lighter components of an emulsion including the steps of passing the emulsion into a treatment vessel, establishing at least one dual frequency electric field within the vessel and selectably varying the electric field at a frequency $F_1$ modulated in intensity at a frequency $F_2$ where $F_1$ is greater than $F_2$.

30 Claims, 14 Drawing Sheets

DUAL FREQUENCY ELECTROSTATIC COALESCENCE

REFERENCE TO PENDING APPLICATIONS

This application is not based upon any pending domestic or international patent application.

REFERENCE TO MICROFICHE APPENDIX

This application is not referenced in any microfiche appendix.

FIELD OF THE INVENTION

This invention is in the field of electrostatic coalescence of an immiscible component of an emulsion, and is particularly related to coalescence of water droplets in an oil emulsion as is commonly encountered in crude oil.

BACKGROUND OF THE INVENTION

Since the dawn of the petroleum industry, a continuous problem has been separation of oil and water. Nearly all crude oil produced in the world arrives at the earth's surface as a combination of oil and water. In some crude oil, water may be a rather minor component but in most it is a significant component. Further, separation of oil and water is made more difficult when the base fluid is an emulsion wherein water is in small droplets suspended in an oil base.

The basic mechanism by which water is separated from oil is by the use of gravity. Most oil production, after arriving at the earth's surface, is passed through a separator—that is, a vessel in which the crude oil is introduced. The vessel establishes a relative quiescence zone which allows the water to settle to the bottom and oil to rise to the top in the same way that cream rises in milk. Water is drawn from the bottom and oil from the top of the separator. With some crude oils, gravitational separation works efficiently but with other crude oil it is more difficult. It is apparent that if water and oil are not highly emulsified—that is, if water is not in the form of very small or even microscopic droplets, gravitational separation is effective. However, in many applications, water is so finely dispersed in an oil base that gravitational separation is not completely effective, in which case, additional treatment techniques are required.

One standard technique for improving the effectiveness of oil/water separation is by the use of coalescence. By various techniques, small water droplets suspended in oil can be caused to coalesce—that is, to join together to form larger water deposits. As water droplet size increases, the dynamics of gravitational separation improve—that is, large water droplets more freely fall out of an emulsion compared to small water droplets. Treating oil and water emulsions by coalescence is a technique that has long been employed in the petroleum industry.

A basic coalescence concept is to pass an emulsion through an established electric field. A typical way of establishing an electric field is to position spaced apart electrodes, normally metal plates, within the interior of a vessel located so that at least a portion of the emulsion passes between them as the emulsion moves through the vessel. Some vessels constructed to augment separation by electrostatic coalescence have a single input and a single output so that no actual separation occurs with the vessel. Such equipment for coalescing can be used in advance of another piece of equipment wherein actual separation of water and oil takes place. For instance, an electrostatic coalescer in which no separation takes place can be used in advance of a hydrocyclone, sometimes referred to as a vortex tube. The emulsion is treated by subjection to an electric field to augment the size of water droplets prior to passage of the emulsion into the hydrocyclone so that the increased size droplets are more efficiently separated by cyclonic action. The same piece of equipment can be used for passing an emulsion through an electric field before conveying the emulsion into a separation vessel when separation takes place by gravity. However, the most frequently employed equipment for treating an emulsion with an electric field is to provide spaced apart plates within a vessel in which the vessel has an emulsion inlet, an upper lighter component (oil) outlet and a lower heavier component (water) outlet. In this way, coalescence and separation are achieved in the same vessel.

A typical system for coalescing heavier and lighter components of an emulsion is illustrated in U.S. Pat. No. 4,400,253 entitled: "Voltage Control System for Electrostatic Oil Treater", having issued on Aug. 23, 1983. In this disclosure, the electric field intensity increases then decreases periodically to augment coalescence. U.S. Pat. No. 4,417,971 entitled: "Circuit for Maintaining the Strength of an Electrostatic Field Generated in a Fluid Mixture of Varying Dielectric Strength" issued on Nov. 29, 1983 teaches a system of enhancing coalescence using electric fields in which rectifiers are arranged to maintain the strength of an electrostatic field as the dielectric strength of the liquid mixture changes.

The present invention is a method and a system of augmenting the separation of immiscible heavier and lighter components of an emulsion including the steps of introducing the emulsion into a vessel having an electric field therein to which the emulsion is subjected while varying the electric field at a frequency $F_1$ modulated in amplitude at a frequency $F_2$ wherein $F_1$ is greater than $F_2$.

Additional background information relating to the separation of heavier and lighter components of an emulsion can be obtained from the following United States patents:

| PATENT NO. | INVENTOR | TITLE |
| --- | --- | --- |
| 1,116,299 | Laird et al. | Process of Treating Petroleum Emulsions |
| 1,276,387 | McKibben | Method of Separating Associated Liquids |
| 2,120,932 | Dillon | High Frequency Induction Dehydrator |
| 2,849,395 | Wintermute | Method and Apparatus for Electrical Separation of Emulsions |
| 3,772,180 | Prestridge | Electric Treater |
| 3,839,176 | McCoy et al. | Method and Apparatus for Removing Contaminants from Liquids |
| 3,847,775 | Prestridge | Process for Electrical Coalescing of Water |
| 4,126,537 | Prestridge | Method and Apparatus for Separation of Fluids with an Electric Field |
| 4,161,439 | Warren et al. | Apparatus for application of Electrostatic Fields to Mixing and Separating Fluids |
| 4,200,516 | Pope | Electrostatic Coalescing System |
| 4,204,934 | Warren et al. | Process for Application of Electrostatic Fields to Mixing and Separating Fluids |
| 4,224,124 | Pope | Electrostatic Coalescing System |

-continued

| PATENT NO. | INVENTOR | TITLE |
|---|---|---|
| 4,283,290 | Davies | Purification Utilizing Liquid Membrane with Electrostatic Coalescence |
| 4,290,882 | Dempsey | Electrostatic Separation of Impurities Phase from Liquid-Liquid Extraction |
| 4,308,127 | Prestridge et al. | Separation of Emulsions with Electric Field |
| 4,400,253 | Prestridge et al. | Voltage Control System for Electrostatic Oil Treater |
| 4,415,426 | Hsu et al. | Electrodes for Electrical Coalescense of Liquid Emulsions |
| 4,417,971 | Ferrin et al. | Circuit for Maintaining the Strength of an Electrostatic Field Generated in a Fluid Mixture of Varying Dielectric Strength |
| 4,469,582 | Sublette et al. | Electrically Enhanced Inclined Plate Separator |
| 4,479,164 | Siegel | Control for an Electrostatic Treater |
| 4,581,119 | Rajani et al. | Apparatus for Separating a Dispersed Liquid Phase from a Continuous Liquid Phase by Electrostatic Coalescence |
| 4,581,120 | Sublette | Method and Apparatus for Separating Oilfield Emulsions |
| 4,601,834 | Bailes et al. | Settling of Liquid Dispersions |
| 4,606,801 | Prestridge et al. | Electrostatic Mixer/Separator |
| 4,702,815 | Prestridge et al. | Distributed Charge Composition Electrodes and Desalting System |
| 4,747,921 | Bailes et al. | Liquid-Liquid Contacting |
| 4,767,515 | Scott et al. | Surface Area Generation and Droplet Size Control in Solvent Extraction Systems Utilizing High Intensity Electric Fields |
| 4,804,453 | Sublette et al. | Resolution of Emulsions with Multiple Electric Fields |
| 5,147,045 | Chi et al. | Particulate Separations by Electrostatic Coalescence |
| 5,411,651 | Yamaguchi et al. | Method for Electrostatic Liquid/Liquid Contactor |
| 5,421,972 | Hickey et al. | Process and Apparatus for Removing Soluble Contaminants from Hydrocarbon Streams |
| 5,464,522 | MacEdmondson | Electrostatic Oil Emulsion and Treating Method and Apparatus |
| 5,543,027 | Yamaguchi et al. | Apparatus for Electrostatic Liquid/Liquid Contactor |
| 5,565,078 | Sams et al. | Apparatus for Augmenting the Coalescence of Water in a Water-In-Oil Emulsion |
| 5,575,896 | Sams et al. | Method and Apparatus for Oil/Water Separation Using a Dual Electrode Centrifugal Coalescer |
| 5,643,431 | Sams et al. | Method for Augmenting the Coalescence of Water In A Water-In-Oil Emulsion |
| 5,824,203 | Remo | Method and Means for Changing Characteristics of Substances |
| 6,010,634 | Sams et al. | System and Method For Separating Mingled Heavier And Lighter Components Of A Liquid Stream |
| 6,113,765 | Wagner et al. | Methods for Enhanced Resolution of Hydrocarbon Continuous Emulsions or Dispersions with Conductivity Modifiers |
| GB 1,205,562 | Thornton et al. | Liquid/Fluid Extraction Process |

BRIEF SUMMARY OF THE INVENTION

The invention herein provides a method and a system for augmenting the separation of an emulsion—that is, the separation of immiscible heavier and lighter components of an emulsion. The method includes the essential steps of passing the emulsion into a treatment vessel. An electric field is established within the vessel. The electric field is varied at a preselected frequency $F_1$. The intensity of the electric field is modulated at a second frequency $F_2$. Thus the field is of dual frequency and the method may be considered dual frequency coalescence. The system includes a vessel having an emulsion inlet and at least one fluid outlet. Electrodes established within the vessel provide a treatment area therebetween through which at least some of the emulsion passes as it flows between the emulsion inlet and the fluid outlet. The circuitry connected to the electrodes provide an electric field within the treatment area, the circuitry serving to vary the electric field at a frequency $F_1$ while simultaneously the intensity of the field is modulated at a frequency $F_2$. $F_1$ is greater than $F_2$.

Further objects and features of the present invention will be apparent to those skilled in the art upon reference to the accompanying drawings and upon reading the following description of the preferred embodiments.

BRIEF DESCRIPTION OF THE DRAWINGS

FIGS. 2A and 2B illustrate wave form patterns that are obtained when a rectifier is used in series with an electrode.

FIG. 3 shows the invention adaptable for use for desalting an emulsion in which fresh water is injected into the system for use in carrying away excessive salt from the emulsion while at the same time the electrostatic coalescing feature of the system reduces the amount of water contained in oil passing from the system.

FIG. 8 illustrates how the electrostatic coalescence system of this invention may be employed in combination with other separation technologies to achieve enhanced separation of oil and water components.

FIG. 11 shows a further embodiment of the invention to illustrate the applicability of the dual frequency coalescence concept to various separation vessels and various separation systems. This figure shows the application of centrifugal flow in conjunction with an electrostatic field and particularly, in conjunction with a dual frequency electrostatic field, to achieve improved coalescence.

DETAILED DESCRIPTION OF THE PREFERRED EMBODIMENTS

Electric fields have been used for augmenting the coalescence of emulsions for many years. Electric fields have been used as established by steady state DC voltage potentials, alternating current potentials, rectified alternating current potentials, pulsed DC voltage potentials and combinations of these. The use of electric fields to augment coalescence has been particularly employed in the petroleum industry to aid in the separation of water and oil. Coalescence means the joining of small droplets together to form larger droplets.

In recent years, improved coalescence results have been obtained by using pulsed DC voltage fields. This technology is significant in high water content applications—that is, typically where the water is over thirty percent (30%) of the emulsion and where traditional electrostatic processes do not function consistently and effectively. In order to establish pulsed DC fields in an emulsion having high water content it is normally helpful to utilize insulated electrodes.

Figure 1:
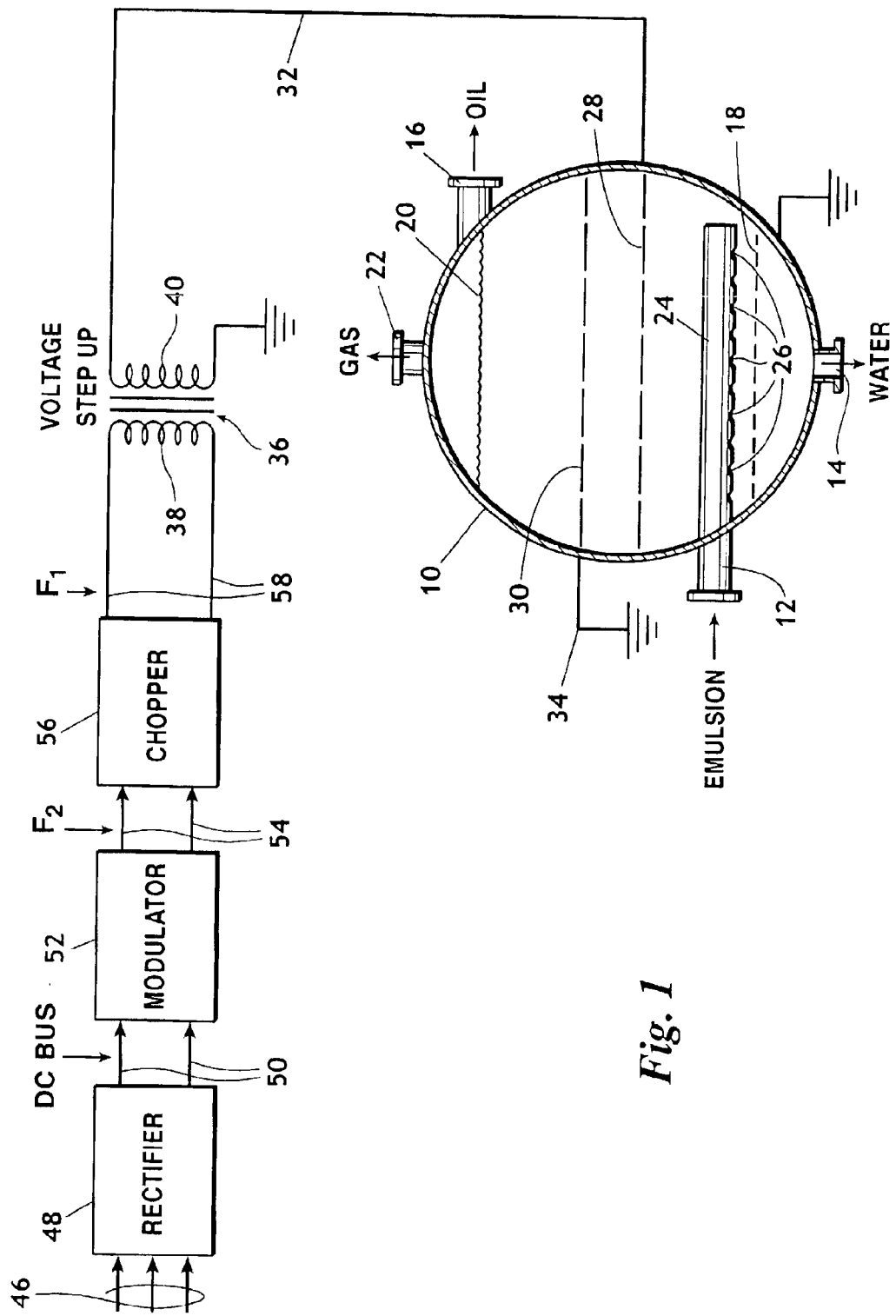
FIG. 1 is a schematic diagram showing a circuit for supplying electrical energy to spaced apart electrodes positioned in a treatment vessel. An emulsion flows into the treatment vessel. At least a portion of the emulsion passes within the electric field created between the electrodes. The vessel includes a heavier component (water) outlet in a lower portion of the vessel and a lighter component (oil) outlet in the upper portion of the vessel. The circuitry of FIG. 1 varies the electric field established within the vessel between the electrodes at a first frequency $F_1$ and modulates the intensity of the varying electric field at a frequency $F_2$, where $F_1$ is greater than $F_2$.

Referring to FIG. 1, a typical application of the present invention is diagrammatically illustrated. A vessel is indicated by the numeral 10 having an emulsion inlet 12, a heavy component (water) outlet 14 and a lighter component (oil) outlet 16. Coalescence can be employed to separate heavier and lighter components of various emulsions, however, the most widespread application of the technology is in the oil industry where coalescence is used to augment the separation of oil and water from crude oil. Most crude oil found in a subterranean formation arrives at the earth's surface as an emulsion containing both oil and water. At the surface and in various stages of transporting and refining of crude oil it is important to be able to separate out the water content. Thus the heavy component outlet 14 can typically be considered a water component outlet while the lighter component outlet 16 can typically be considered an oil outlet. This invention will be described as it is particularly applicable to emulsions, such as crude oil, wherein water is the heavier component, as is the usual situation. There are areas of the earth that produce heavy oil, that is a crude oil emulsion in which the emulsified water component is lighter than the hydrocarbon component. The methods and systems herein described can be applied to promote coalescence of water droplets in such heavy oil applications. A primary difference is that separated water is withdrawn from an upper portion of a vessel while heavy oil is taken from a lower portion but the methods of creating and using dual frequency electrostatic fields to promote coalescence remain the same.

Within vessel 10 water is separated from the inlet emulsion by gravity forming an oil/water interface 18. Separated oil above interface 18 rising to a level 20, above which gas accumulates, the gas being withdrawn through gas outlet 22.

The emulsion inlet 12 is connected to one or more distributor pipes 24 which have small diameter outlet openings 26 through which emulsion enters into vessel 10. Distributor pipe 24 is representative of various fluid inlet systems designed to admit emulsion into vessel 10 while producing minimal turbulence.

Positioned within vessel 10 is a first electrode 28 and spaced from it, a second, ground electrode 30.

Electrodes 28 and 30 are perforated and are positioned within vessel 10 so that emulsion passes therethrough and therebetween as it progresses from inlet 12 to outlets 14 and 16. Electrodes 28 and 30 form an electric field that is above oil/water interface 18. To augment the formation of water droplets, electric energy is applied between electrodes 28 and 30. For this purpose, a first conductor 32 extends to electrode 28 and a second conductor 34 connects second electrode 30 to ground. Vessel 10 is at ground potential and therefore second electrode 30 can be directly connected to the interior of the vessel, eliminating the need for second conductor 34.

Electric potential is applied between electrodes 28 and 30 by means of a transformer 36 having a primary winding 38 and a secondary winding 40. Voltage across secondary winding 40 is fed between ground potential and conductor 32. If a steady state AC voltage is applied to primary winding 38 of transformer 36, the system for augmenting the separation of heavier and lighter components of an emulsion utilizing an electric field described to this point is standard procedure. However, the system of this invention is different essentially in the way in which electrical energy is applied to transformer primary winding 38.

Figure 2:
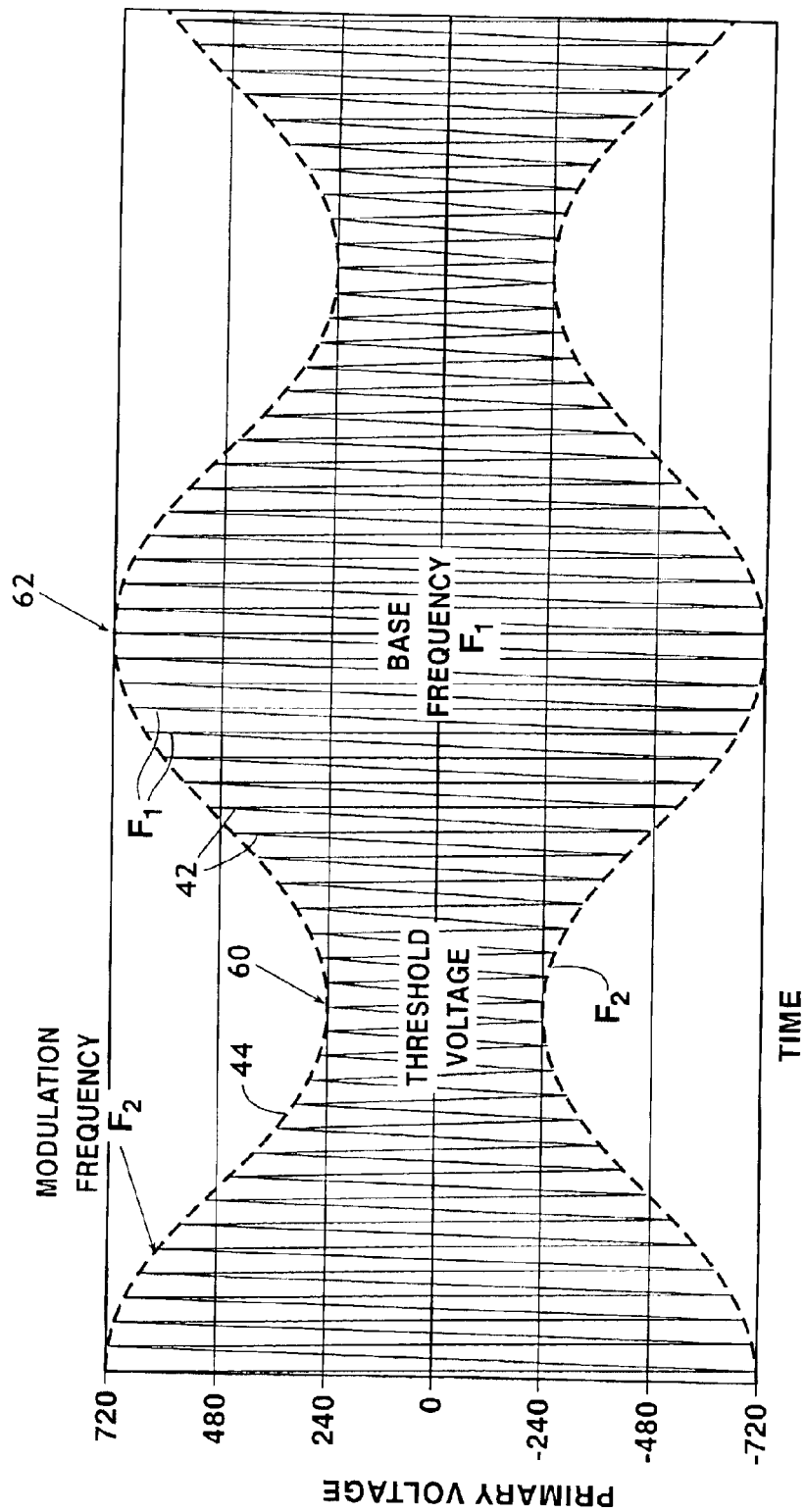
FIG. 2 is a representative wave form pattern of electric potential applied to electrodes in a treatment vessel as used for practicing the method of this invention for augmenting the separation of immiscible heavier and lighter components of an emulsion. The graph of FIG. 2 shows a pattern of voltage applied to the primary of a transformer to create an electric field having a base wave form with a frequency $F_1$ modulated in intensity at a frequency $F_2$.

Before describing the elements of FIG. 1 that control the wave form of electrical energy applied to the primary of transformer 36 reference will now be had to FIG. 2. This figure shows a wave form in which voltage is the abcessa and time is the ordinance—that is, indicating how the amplitude or intensity of a base frequency varies with time. The voltage wave form consists of a base frequency indicated by wave form 42 (the frequency of wave form 42 will be referred to hereafter as $F_1$) and in which the intensity or amplitude of the base frequency is modulated at a frequency $F_2$. The amplitude of modulation if $F_1$ is the wave form 44—that is, the frequency of wave form 44 is $F_2$.

Figure 2A:
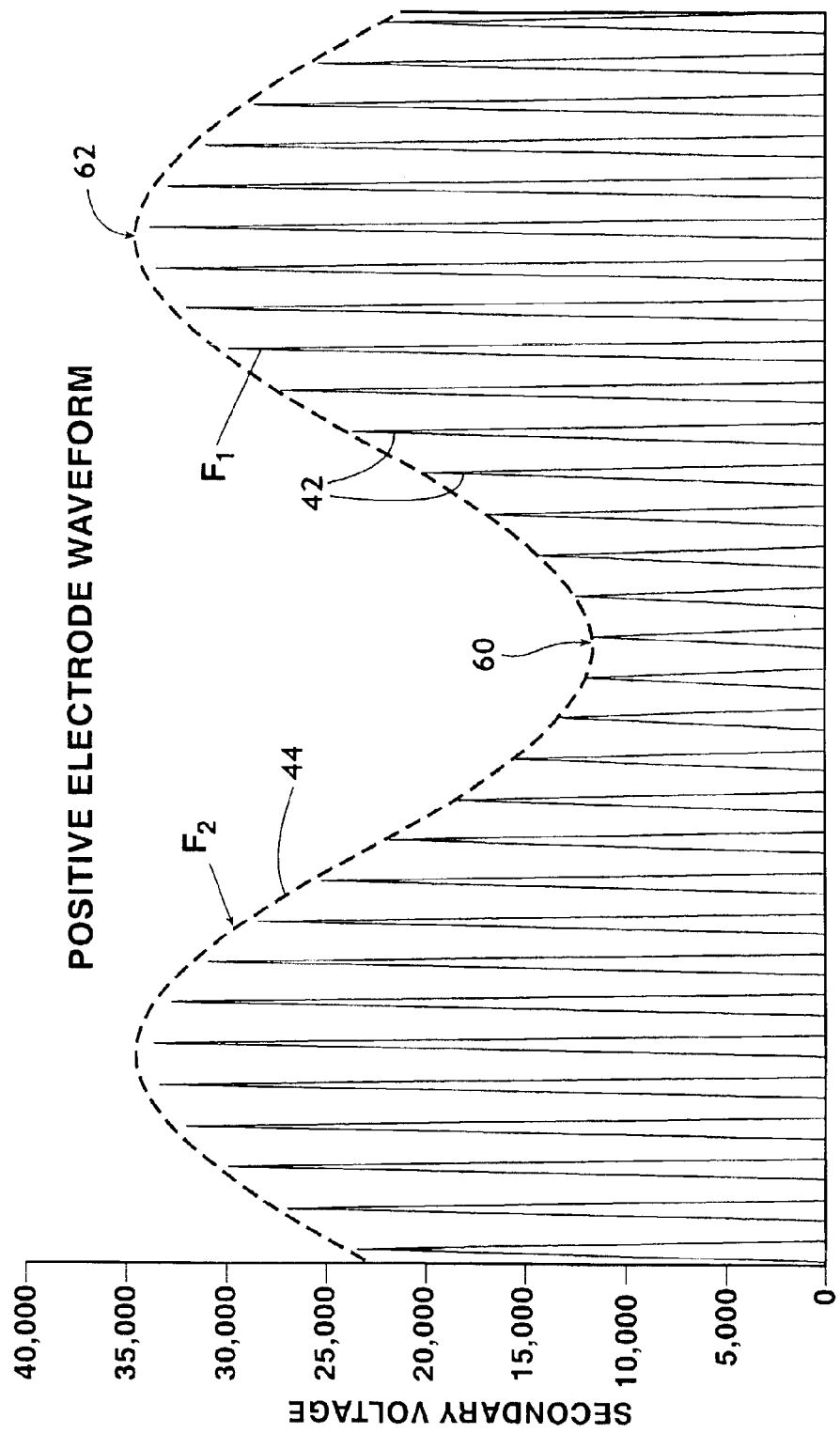
FIG. 2A shows the wave form of positive voltage provided at the secondary of a high voltage transformer for use in practicing the invention.
Figure 2B:
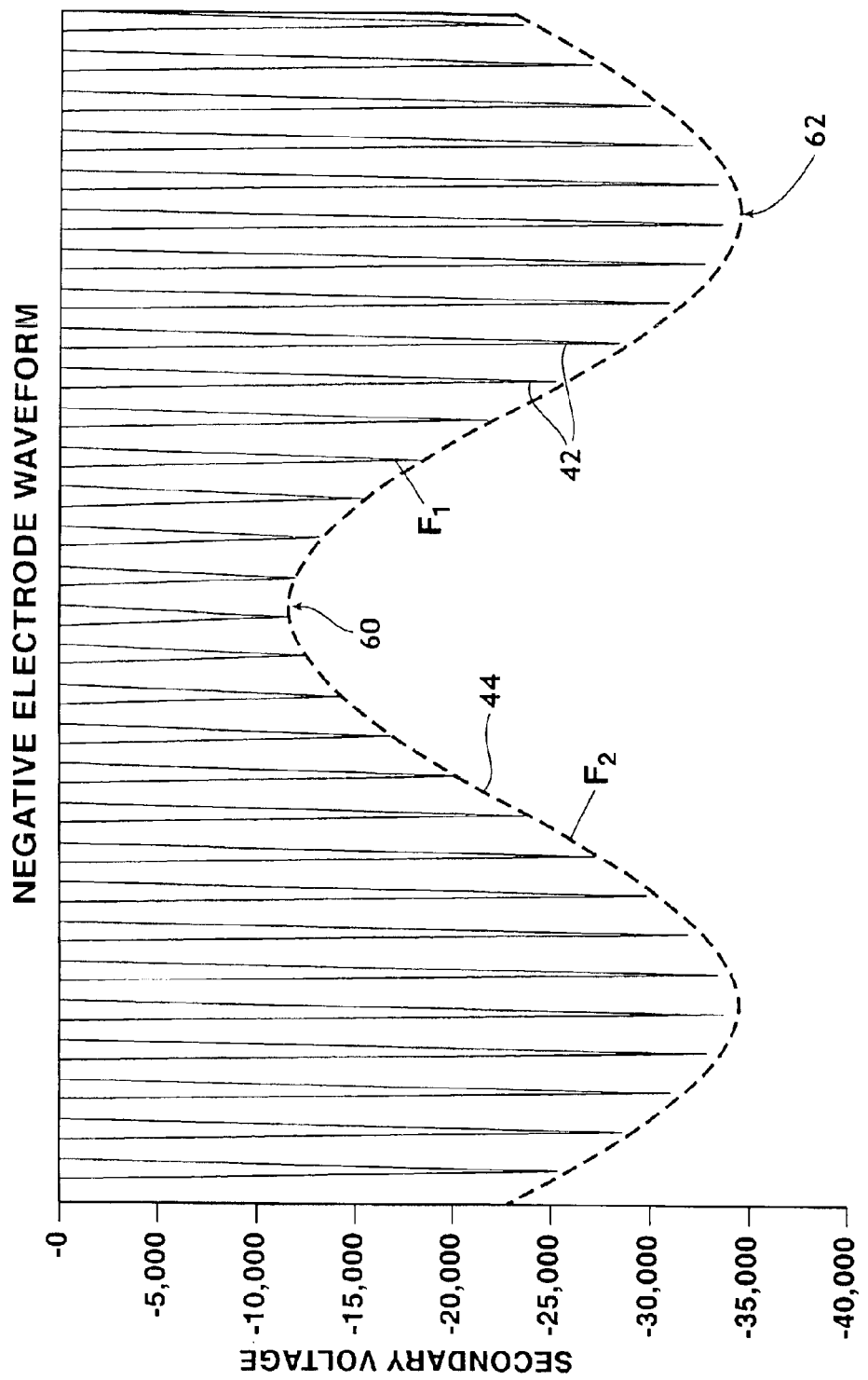
FIG. 2B shows the wave form of negative voltage at the secondary of a high voltage transformer as used in practicing the invention.
Figure 2C:
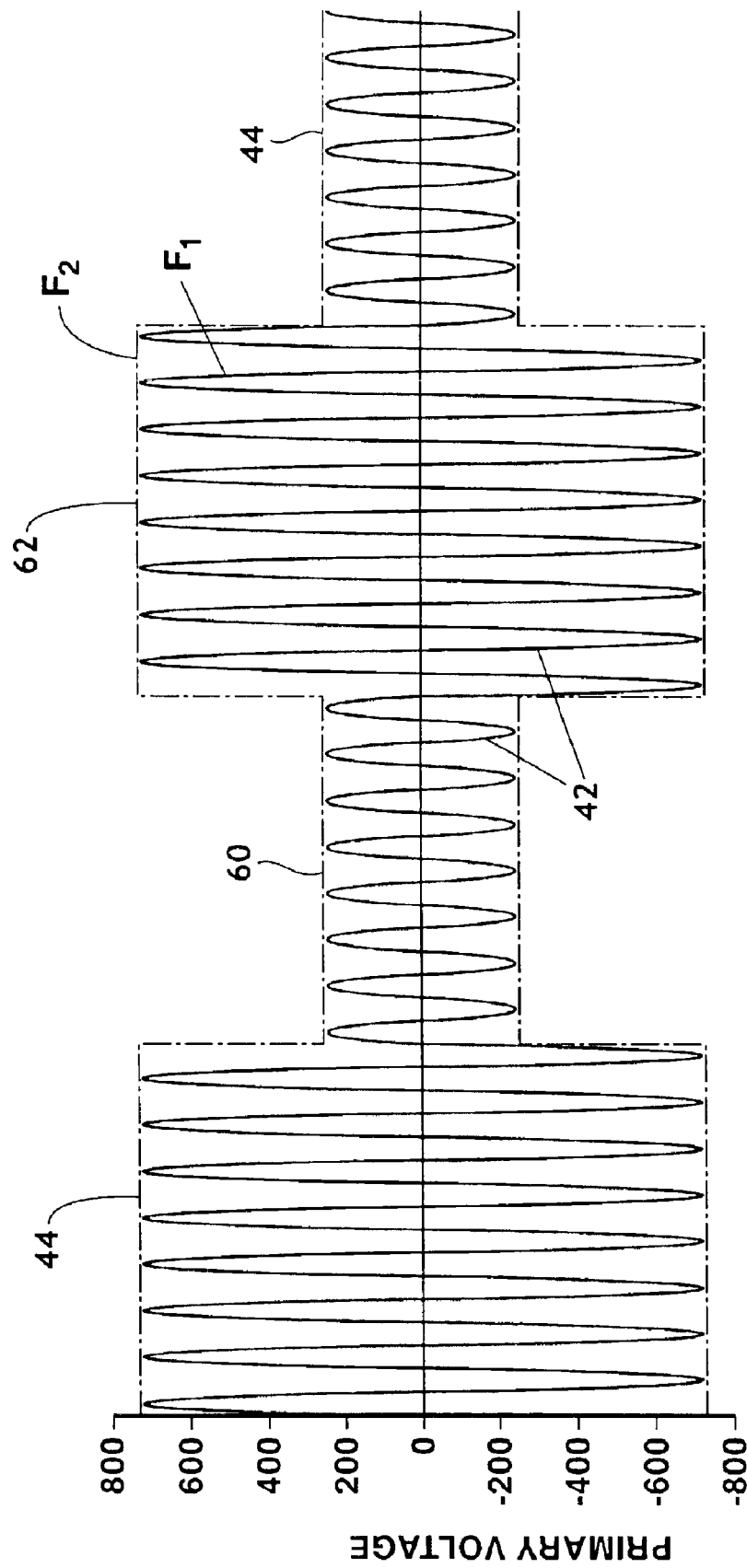
FIG. 2C is similar to FIG. 2 except it shows a voltage pattern applied to a transformer primary when the modulation frequency $F_2$ is a square wave.

FIG. 2 shows the base signal 42 ($F_1$) that is applied to the primary of transformer 36 of the system of FIG. 1 when the amplitude of modulation 44 ($F_2$) is in the form of a sine wave. The frequency of $F_1$ is substantially greater than the frequency of $F_2$. $F_2$ may be in the form of a sine wave, as shown in FIG. 2 or can be in the form of a square wave as seen in FIG. 2C. Modulating signal 44 ($F_2$) can, in addition, be a trapezoidal wave, a triangular-shaped wave, an exponential wave, a logarithmic wave, a semi-circular wave, an inverse semi-circular wave or other symmetrical or non-symmetrical shaped wave. Not only can the shape of $F_2$ vary but also, as to some signal shapes, the tilt of the wave may vary. As an example, a triangular shaped wave form may be symmetrical, that is rise and fall at the same rate, or it could be asymmetrical, such as rising rapidly and falling slowly, or vice versa. In some applications the use of an asymmetrical wave form $F_2$ has a distinct advantage.

Base signal 42($F_1$) is shown in FIGS. 2, 2A, 2B and 2C in the shape of a sine wave. This is by example only. In many applications, $F_1$ is essentially a square wave.

It can be seen from FIG. 1 that the electrical energy supplied to electrodes 28 and 30 of vessel 10 consists of an electric field varied at a frequency $F_1$ and simultaneously modulated in intensity at a frequency $F_2$. The structure of FIG. 1 operates as a dual frequency electrostatic coalescence system using a dual frequency method to augment the coalescence of an emulsion.

Returning to FIG. 1, the signal of a type illustrated in FIG. 2 can be created by utilizing a three phase voltage input 46 feeding a rectifier 48 to produce a DC voltage on voltage bus 50. A modulator 52 converts the DC voltage to a modulation signal 44 ($F_2$) as seen in FIG. 2 that is fed to conductors 54. A chopper circuit 56 then chops up the voltage signal $F_2$ to the higher frequency base voltage signal $F_1$ as seen in FIG. 2. The base voltage signal $F_1$ modulated in intensity by the signal $F_2$ appears on conductors 58 that feed the primary 38 of transformer 36.

The dual frequency wave form appearing at the secondary winding 40 of high voltage transformer 36 can be created in a number of ways. The circuit portion of FIG. 1 as above described, is a system in which a modulation wave form $F_2$ is first created and then chopped to produce the higher frequency base wave form $F_2$. Alternatively, a circuit system similar to an AM radio transmitter can be employed in which the base frequency $F_1$ is created that is then modulated in intensity by a signal $F_2$. The particular electrical circuit system utilized to provide a high voltage dual frequency signal, exemplified by FIGS. 2, 2A, 2B and 2C, is not the subject of this disclosure. Instead, this disclosure is concerned with the concept of applying a dual frequency electrostatic voltage charge to an emulsion to augment coalescence and the particular circuitry by which such dual frequency voltage signal is obtained is not the essence of the invention since circuits to accomplish a dual frequency wave form are well within the skill of the electrical engineering profession.

Circuit components 48, 52 and 56 are by way of illustration only and rudimentarily indicate by way of example, a circuit that can be used to provide a signal represented in FIG. 2.

In practicing this invention, the electrical energy signal applied to electrodes within a treatment vessel are selected in response to the characteristics of the emulsion being treated. It has been determined that improved coalescence of a water-in-oil emulsion is obtained if the base frequency $F_1$ is proportional to the electrical conductivity of the oil component of the emulsion, conductivity being expressed as pS/m. As an example, in an emulsion wherein the conductivity of the oil component is 75,000 pS/m, the preferred base frequency is approximately 1450 Hz.

It has further been determined that coalescence is improved if the modulation frequency $F_2$ increases as water droplets size in the emulsion decreases—that is, small water droplets in the emulsion require the use of a higher modulation frequency than is the case if the droplets in the emulsion are larger. As an example, if the water droplet diameter in the emulsion averages 500 microns, the system more effectively augments coalescence when the modulation frequency or $F_2$ is about 6.4 Hz.

Assuming that the emulsion passing into inlet 12 of the coalescing vessel 10 of FIG. 1 has a characteristic wherein the conductivity of the oil component is 75,000 pS/m and the average diameter of the water droplets is about 500 microns then the signal appearing at the transformer primary 38, or, correspondingly at the output of the transformer secondary 40, should have a base frequency of about 1450 Hz while the modulation frequency $F_2$ should be about 6.4 Hz.

To augment coalescence an electric field requires a threshold voltage, this is, a minimum voltage to initiate coalescence. As used herein the term "threshold voltage" means the lowest voltage level with sufficient energy to initiate coalescence of dispersed water from an emulsion of oil and water. This voltage depends on several oil properties including interfacial tension and conductivity. The theoretical threshold voltage cannot be calculated and is generally best determined experimentally due to its dependence on electrode and vessel geometry.

Contrasted with the threshold voltage is the "critical voltage," that is, the highest voltage which permits coalesced water droplets to separate. Exceeding the critical voltage results in a reduction in the water droplet diameters and stops separation of water from oil. The critical voltage can be estimated from the Stoke's diameter of the water droplets.

"Minimum voltage" is related to the threshold voltage and is the lowest voltage 60 applied to the electrodes at the modulation frequency, $F_2$ In practice when the minimum voltage is at or near the threshold voltage maximum droplet diameters can be achieved resulting in maximum separation rates and lowest residual water content in the effluent. "Maximum voltage" is related to the critical voltage and is the highest voltage 62 applied to the electrodes at the modulation frequency, $F_2$ In practice, the maximum voltage can exceed the critical voltage but only for a short duration. Exceeding the critical voltage momentarily permits the smallest dispersed water droplets to be energized and coaxed into participating in the coalescence and separation process.

In practicing the invention herein the minimum voltage 60 should be at or slightly below the threshold voltage and the maximum voltage 62 should be at or slightly above the critical voltage.

Further, as used herein, the term "base frequency" $F_1$ means the minimum frequency required to prevent the full discharge of dispersed water droplets. This frequency is influenced primarily by the conductivity of the oil. The ability to increase the base frequency $F_1$ (above 60 Hz) permits the electrostatic coalescence process to be optimized for a wide range of crude oils. "Modulation frequency" $F_2$ is the natural frequency of the largest water droplet that will form at the minimum voltage. While this frequency may be calculated for any droplet diameter, interfacial tension and droplet mass, in practice it is best determined experimentally due to varying hydraulic efficiencies of different process vessels.

In practicing the method of this invention, $F_1$ may be a frequency in the range about 60 to about 2500 Hz while $F_2$ is preferably in the range of about 3 to about 100 Hz. In general, the system of this invention makes use of a base frequency $F_1$ that is generally higher than alternating current fields used in electrostatic coalescers of the past.

In general, it has been determined that for a given emulsion of water and oil of the type that occurs in the production of crude oil, the base frequency $F_1$ is selected by reference to the conductivity of the oil in the emulsion; the modulation frequency $F_2$ is selected by reference to the water droplet mass and/or interfacial tension of the emulsion; the minimum voltage 60 is selected to be near or only slightly below the threshold voltage which is related to the interfacial tension and conductivity of the oil component of the emulsion. The minimum voltage 60 can also vary somewhat according to the vessel geometry.

The critical voltage at which separation stops is determined by reference to the Stoke's diameter of the water droplets that are suspended in the rising oil steam. Maximum voltage 62 should, as previously stated, be near the critical voltage.

"Threshold voltage" and the "critical voltage" as used herein are voltages determined by physical laws and that are controlled by the characteristics of the emulsion being treated, the geometry of the treatment vessel and the flow rates of the emulsion. "Minimum voltage" and "maximum voltages" mean those voltages defining the amplitude of $F_2$ and are voltages selected by an engineer designing a system to practice the dual frequency process disclosed herein. As previously stated, the minimum voltage defining $F_2$ should be near, but not necessarily coincident with the threshold voltage and the maximum voltage defining $F_2$ should be near, but not necessarily coincident with the critical voltage of the emulsion. As previously stated, in some applications the minimum voltage may advantageously be slightly below the threshold voltage and the maximum voltage may be slightly greater than the critical voltage.

Figure 3:
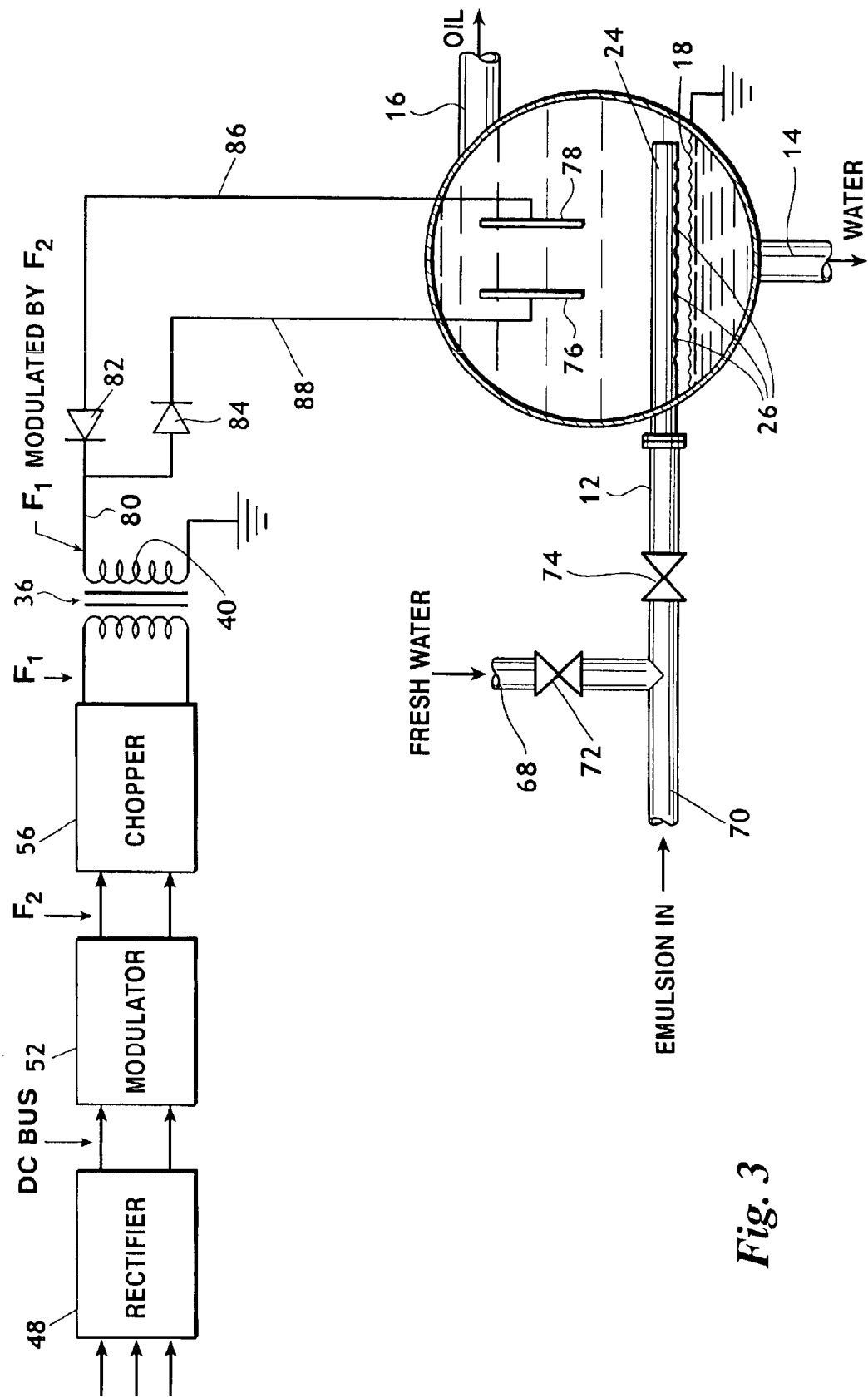
FIG. 3 is an altered embodiment of the basic concept to the invention in which a diode is in series with each electrode in the treating vessel so that the voltage wave form, with respect to ground, is a half wave cycle with one electrode having a positive half wave cycle and the other electrode a negative half wave cycle. Further.

FIG. 3 is an alternate embodiment of the method and system of this invention. Sometimes crude oil brought to the earth's surface from a subterranean formation carries with it excessive salt in the form of entrained brine. For efficiency of transportation and refining, it is advantageous to have the salt content reduced. The flow arrangement of the system of FIG. 3 is particularly applicable for coalescence and separation of a water-in-oil emulsion, such as crude oil and further, is also applicable to desalting crude oil. In the system of FIG. 3, fresh water is mixed with crude oil. The fresh water absorbs salt from the emulsion (crude oil). Fresh water is added to the emulsion through a fresh water inlet 68 that merges with emulsion inlet pipe 70 to feed into the vessel emulsion inlet 12. A water control valve 72 in fresh water inlet 68 is used to control the amount of fresh water added to the emulsion passing through inlet 70. The total volume flow into vessel 10 through emulsion inlet 12 is controlled by emulsion inlet valve 74.

Within vessel 10 coalescence is augmented by an electrostatic field to which the emulsion is subject to causing water drops to enlarge and fall out of the emulsion into the area creating the oil/water interface 18. Water is withdrawn through pipe 14. Oil having a significant portion of the entrained water, including the fresh water added from fresh water inlet 68 having salt dissolve therein is thereby taken out before the oil content of the emulsion is discharged through oil outlet 16.

Thus the arrangement of FIG. 3 functions either as a separator enhanced by dual frequency electrostatic coalescence and/or a desalter enhanced by dual frequency coalescence.

In the arrangement of FIG. 3 as compared to FIG. 1, first and second electrodes 76 and 78 are shown oriented vertically with space therebetween through which emulsion flows as it migrates from a lower portion of the vessel interior towards upper oil outlet 16. A dual frequency electrostatic field is formed between electrodes 76 and 78. The actual physical construction of electrodes 76 and 78 can be such that substantially all of the emulsion passes therebetween or is at least subjected to the electrostatic field created by electrical signals applied to the electrodes. The electrodes in FIG. 3 are illustrated diagrammatically.

The output of transformer secondary 40 is fed by a conductor 80 to a first rectifier 82 and, in parallel therewith, a second rectifier 84. Conductor 86 connects rectifier 82 in series with electrode 78 and conductor 88 connects rectifier 84 to electrode 76. The voltage signal applied to each of electrodes 76 and 78 is therefore a half wave rectified signal. FIG. 2A illustrates the wave form of voltage appearing on electrode 76 and FIG. 2B illustrates the wave form of voltage appearing on electrode 78. Further, one leg of transformer secondary 40 is at ground potential and vessel 10 is typically at ground potential as indicated, so that the electrostatic field established within vessel 10 exists not only between the opposed electrodes 76 and 78 but also between the electrodes and the wall of vessel 10.

When the separator system of FIG. 3 is utilized for desalting, in which fresh water is introduced as has been previously discussed, it is important that the emulsion (more specifically the crude oil having excess salt therein) be thoroughly mixed with the fresh water before the diluted emulsion enters into vessel 10. The emulsion inlet valve 74 is used to regulate the rate of input flow into vessel 10 and also serves the function of mixing the emulsion with fresh water before the diluted emulsion enters the vessel 10. Therefore, valve 74 preferably produces a 5–15 psi pressure drop to achieve its mixing function.

Figure 4:
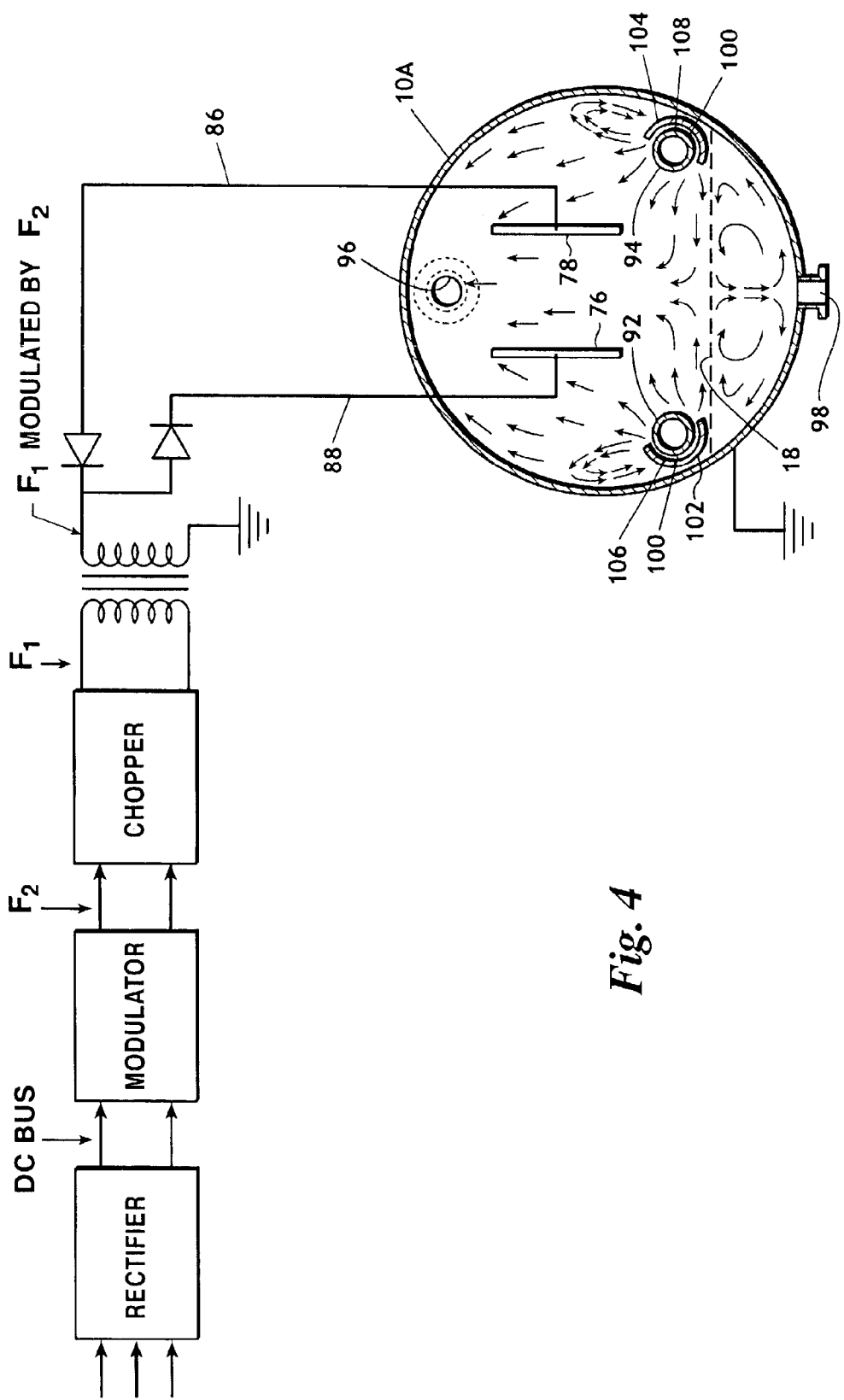
FIG. 4 illustrates an arrangement employing the same circuitry as FIG. 3 but wherein the vessel has a liquid inlet system by which the emulsion enters the vessel. Distribution conduits within the vessel each have a plurality of spaced-apart small diameter openings through which the emulsion is discharged as small streams. A momentum attenuator is supported adjacent each of the distribution conduits and is configured to intercept the small streams to dissipate the kinetic energies thereof. This less-turbulent inlet fluid flow results in more effective coalescence of the emulsion as it is subjected to the electric field established within the vessel.

FIG. 4 shows a separation system that is basically similar to the system of FIG. 3 with an important improvement. In FIG. 4 vessel 10A is equipped with an inlet system for providing improved distribution of emulsion flowing into separation vessel 10A. Particularly, the arrangement of FIG. 4 provides a system in which the kinetic energies of input flow into the vessel are reduced by including an energy attenuation system that substantially reduces the creation of parasitic flow streams and thereby substantially reduces turbulence in the emulsion. The separation of coalesced water droplets from an oil emulsion ultimately depends upon the action of gravity. Turbulence is counterproductive to effective gravitational oil/water separation. The advantage of the dual frequency electrostatic system as has been discussed is enhanced when turbulence of the emulsion is reduced.

In the system of FIG. 4, vessel 10A has a first distribution conduit 92 and a second distribution conduit 94 which are in parallel with each other. Distribution conduits 92, 94 are connected to an emulsion inlet pipe (not seen) by which an emulsion is introduced into the interior of vessel 10A. In the upper portions of the vessel there is an oil outlet 96 that is equivalent to the oil outlet 16 of FIG. 3 and in the lower end of the vessel, a water outlet 98 that is equivalent to the water outlet 14 of FIG. 3. Within the vessel an oil/water interface 18 is maintained. The vessel has first and second electrodes 76 and 78 as described with reference to FIG. 3, and circuitry that includes the basic components of a rectifier 48, a modulator 52 and a chopper 56 that are representative of components that provide a base frequency signal that is modulated, the signal being applied to electrodes 76 and 78 to produce a dual frequency electrostatic field within the vessel to which the emulsion is subjected.

Distribution conduits 92 and 94 have small diameter spaced apart openings 100 therein. The emulsion that flows into the interior of vessel 10A passes through these small diameter openings. The flow of liquid through a small diameter opening normally produces a jet effect and thereby turbulence, however, there is provided adjacent to each of the distributor pipes momentum attenuators 102 and 104. In the illustrated arrangement the momentum attenuators are semi-circular and spaced from the external surface of distributor conduits 92 and 94 providing semi-annular areas 106 and 108. While in the illustrated arrangements the momentum attenuators are shown concentric with the exterior surface of distribution conduits 92 and 94 this is not critical and in some arrangements an asymmetric relationship between the momentum attenuators and the distribution conduits is advantageous.

The function of momentum attenuators 102 and 104 is to intercept and disburse the small jet streams created by emulsion flowing through the small diameter openings and to thereby attenuate parasitic jet streams within the emulsion. The sum result is that emulsion enters the interior of vessel 10 in a manner to reduce, as much as possible turbulence of fluid flow. While fluid migration must take place in order for the emulsion to separate so that the oil component flows out oil outlet 96 and the water component through outlet 98, nevertheless the inlet system illustrated in FIG. 4 creates a substantially turbulent-free environment in which the action of the dual frequency electrostatic field created within the vessel can most effectively function to augment coalescence of water droplets and thereby improve effectiveness of separation of the emulsion into its lighter and heavier components.

For more detailed information of inlet systems used in vessels for separating components of an emulsion, reference can be had to U.S. Pat. No. 6,010,634 issued to Gary W. Sams et al. and entitled "System and Method for Separating Mingled Heavier and Lighter Components of a Liquid Stream."

Figure 5:
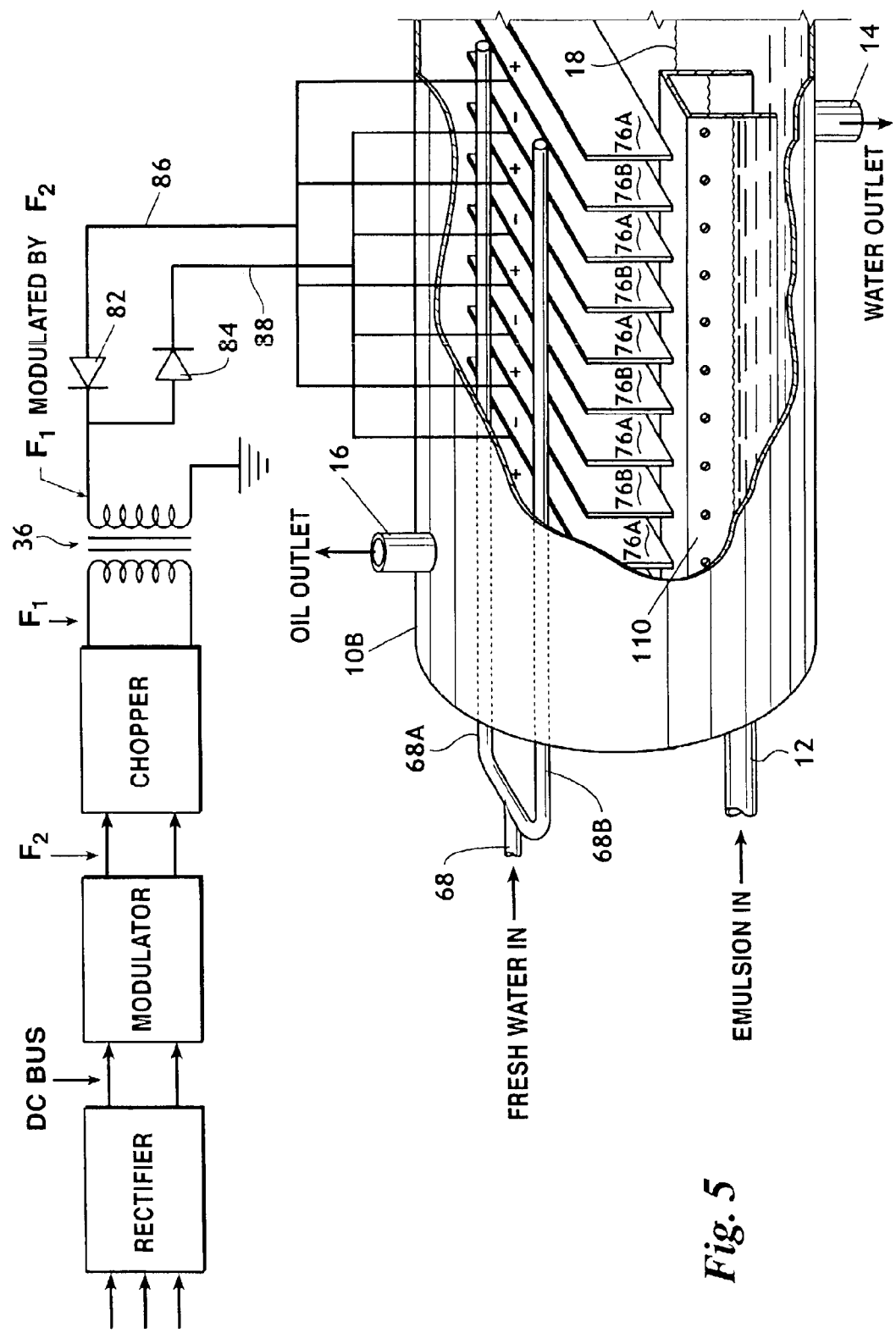
FIG. 5 discloses the method of this invention as applied particularly to a desalting application as has been referenced with respect to FIG. 3 in which fresh water is used in a coalescing environment to reduce the salt content of the oil outlet. A plurality of vertically-positioned, spaced-apart plates provide areas in which electrostatic fields are created by the application of voltage having a wave form with a basic frequency of $F_1$ modulated in intensity at a frequency $F_2$.

Referring to FIG. 5, an embodiment of the invention is illustrated that is particularly applicable for a crude oil desalting application combined with coalescence and separation. In the embodiment of FIG. 5 a plurality of pairs of electrode plates 76A and 76B are illustrated. The plates are vertically oriented to allow vertical passageways therebetween in which emulsion passing therethrough is subject to electrostatic fields. The plates identified by the numeral 76A constitute electrodes that are fed from conductor 88 having rectifier 84 in series therewith so that plates 76A are negatively charged—that is, the signal applied to plate 76A is represented by the lower half of the voltage wave form shown in FIG. 2. Plates 76B are fed by conductor 86 in series with rectifier 82 and are positively charged—that is, the voltage wave form applied to these plates is represented by the wave form in the upper half of the diagram of FIG. 2.

Emulsion inlet pipe 12 connects with a spreader 110 so that the emulsion is distributed above the oil/water interface 18 and the emulsion migrates upwardly between pairs of plates 76A and 76B. Fresh water is introduced through a fresh water supply pipe 68 that branches into pipes 68A and 68B. The branch pipes 68A and 68B have small diameter openings (not seen) therein so that fresh water is introduced above plates 76A and 76B. The fresh water migrates downwardly through the emulsion while the emulsion itself migrates upwardly so that the emulsion and the fresh water is co-mingled in the area between the plates.

The circuitry of the invention herein as exemplified by a rectifier 48, a modulator 52, a chopper 56 and high voltage transformer 36 provides a base signal frequency $F_1$ that is controlled in amplitude by modulator 52 so that the voltage between pairs of plates 76A and 76B varies at a modulation frequency $F_2$ to increase the voltage at a predetermined rate that results in shearing the water droplets in the emulsion to cause the fresh water and sheared water droplets to initially mix whereby excess salt in the emulsion is absorbed by the fresh water. The intensity sequentially changes to cause the water droplets in the emulsion to coalescence and thereby fall out of the emulsion and to collect in the lower portion of the vessel below the oil/water interface 18 to ultimately be drained from the vessel through water outlet 14 while the oil content of the emulsion is passed out through oil outlet 16. In the normal operation of a separator, the oil content is taken out by a collection system near the top of the separator vessel 10B. Thus the system of FIG. 5 employing the unique dual frequency electrical signal supplied on conductors 86 and 88 functions concurrently as a mixer, a coalescer and a separator to thereby more effectively desalt an emulsion while also separating the emulsion into its lighter and heavier components of oil and water.

U.S. Pat. No. 4,606,801 entitled "Electrostatic Mixer/Separator", by Floyd Prestridge et al., illustrates and describes a separator system similar to that of FIG. 5, however, this patent does not teach the unique advantages of the use of a dual frequency voltage. U.S. Pat. No. 4,606,801 provides good background information relating to a multiple plate mixer/separator to which the principles of this invention can be applied.

Figure 6:
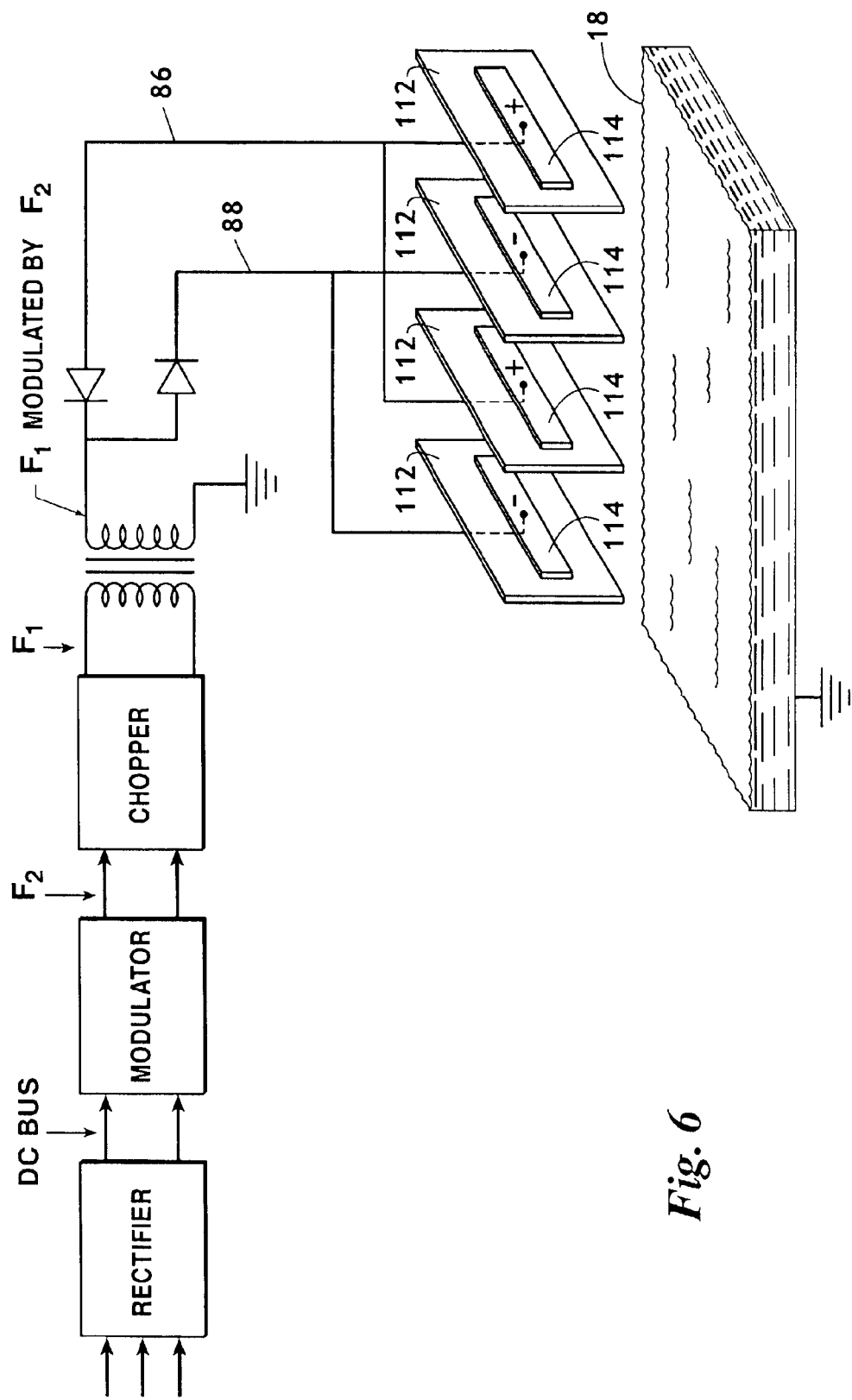
FIG. 6 is a perspective view of two pairs of spaced-apart composite electrodes that form vertical passageways for an emulsion to flow therebetween. The vessel itself is not illustrated but the relationship between the electrodes and a layer of water which lies in the bottom portion of a vessel such as, for example, shown in FIGS. 3–4, forms a conductive ground. The electrodes are each formed as a composite electrode having a substantially planar electrically non-conductive member and a reduced dimensioned substantially planer electrically conductive second member laminated to the non-conductive member.
Figure 7:
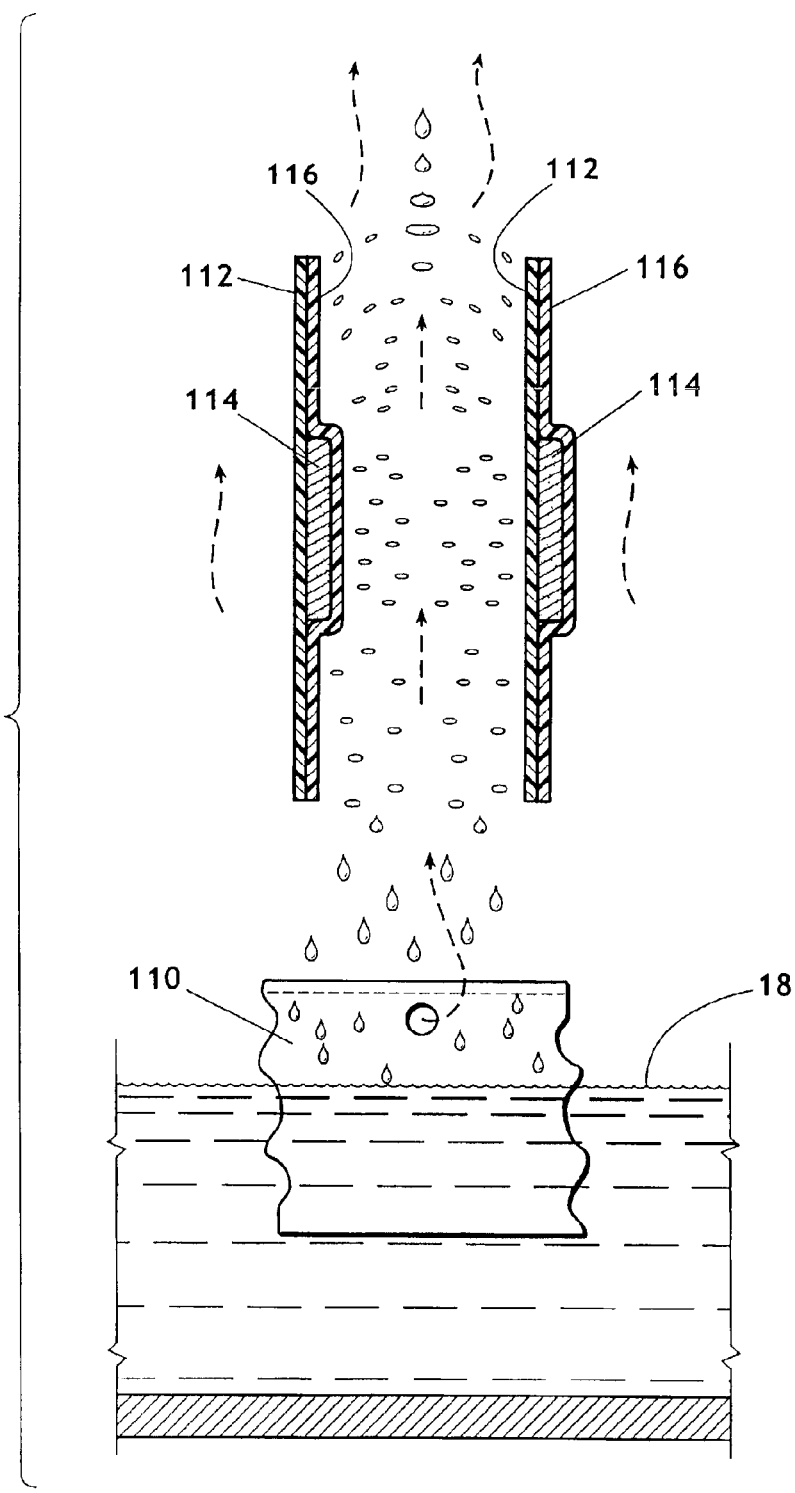
FIG. 7 is an enlarged fragmentary diagrammatic cross-sectional view of the electrode structure of FIG. 6 and shows two adjacent composite electrodes, each formed of a conductive and a non-conductive portion, the electrodes forming a passageway therebetween for emulsion flow.

FIGS. 6 and 7 diagrammatically illustrate a means of practicing the invention herein utilizing especially constructed distributed charge composition electrodes. The method illustrated in FIGS. 6 and 7 can be carried out in a vessel as shown in FIGS. 1, 3, 4, 5 and 8. A plurality of paralleled plates are oriented within an emulsion above an oil/water interface 18 providing an environment in which water droplets in an emulsion are coalesced. Water below interface 18 is removed at a rate to maintain a substantially consistent interface level. Positioned in the emulsion above oil/water interface 18 are a plurality of spaced apart plates 112. In FIG. 6, four plates are illustrated as an example and the plates are specially constructed. Each plate is a laminar construction comprising a substantially planer electrically non-conductive first member 112 and a substantially planer electrically conductive second member 114. The planer dimensions of the second conductive member 114 are less than the planer dimensions of the first member 112 resulting in the second member being centrally located on a side of the first member providing an electrically conductive region surrounded by an electrically non-conductive region.

In the practice of the invention, the emulsion is preferably introduced into a vessel through a distributor 110 as shown in FIG. 7. Distributor 110 is configured like and serves essentially the same purpose as the distributor illustrated in FIG. 5. The separator of FIGS. 6 and 7 is adaptable to function as a desalter in which case fresh water is introduced above plates 112 in a manner such as shown in FIG. 5—that is, if the system of FIG. 6 and 7 is used for desalting as well as for coalescence then, in that case, a system of introducing fresh water is employed. When a fresh water distributor is employed the introduced water passes downwardly between plates 112 in relatively large drops countercurrent to the emulsion that is introduced below the plates whereby as the emulsion enters the electric field established between adjacent plates the emulsion is subjected to an increasing electric field gradient in passing a first non-conductive portion 112 of each plate thence is subjected to a high electric field gradient in passing the conductive central portions 114 of each plate and then is subjected to a decreasing electric field in passing second non-conductive portions of each plate. Similarly, as fresh water passes in countercurrent flow to the emulsion through the electric fields between adjacent plates, the water is subjected to an increasing electric field gradient in passing the non-conductive portions of the plates wherein large droplets are sheared, thence the water is subjected to a uniform high electric field when passing the conductive portions 114 of the plates where smaller water droplets are coalesced and larger water droplets are sheared and the water is mixed with the emulsion thereby increasing the contact of the water with salt in the emulsion. The larger droplets of water having brine absorbed therein are subjected to decreasing electric field gradients in passing the non-conductive portions of the plates as the water moves downwardly towards interface 18.

FIG. 7 illustrates the arrangement wherein the non-conductive portions 112 of each plate has affixed to one side thereof the centralized conductive portions 114. Further, a non-conductive insulation layer 116 covers the rearward surfaces of the plates so that the electrically conducted portion 114 of each plate is not in direct electrical continuity with the fluid flowing through the vessel to thereby insure that the electric fields to which the liquid is subjected is substantially limited only to electrostatic fields. The use of insulation layers 116 help reduce the possibility of arcing between the conductive portions 114 of the plates.

FIGS. 6 and 7 demonstrate a technique of utilizing distributing charge composition electrodes in conjunction with a dual frequency coalescence system and make it possible to take increased advantage of the dual frequency system. In FIGS. 6 and 7, the electrodes are shown with a non-conductive portion 112 and a conductive portion 114. In some applications, the electrodes are preferably formed only of non-conductive material—that is, where conductive metal portions 114 are not employed. Non-conductive electrodes are frequently formed of fiberglass reinforced plastic that is suitable for carrying electric charges and for establishing electrostatic fields to which emulsion is subjected.

For a more detailed explanation of the operation of a separator and/or desalting system that uses distributed charge electrodes, please refer to U.S. Pat. No. 4,702,815 entitled "Distributed Charge Composition Electrodes and Desalting System" issued to Prestridge et al., as well as the references cited in this patent.

Figure 8:
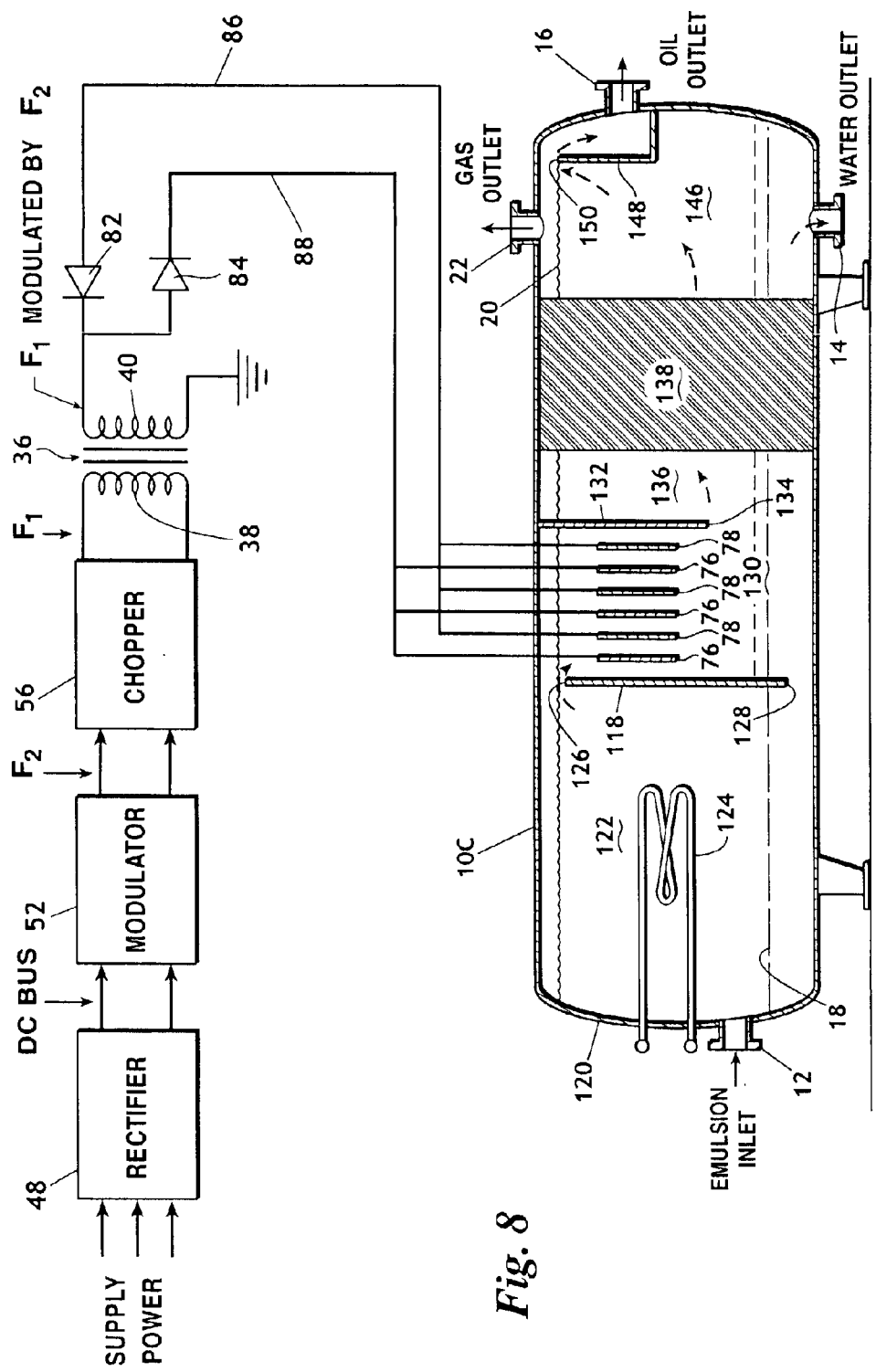
FIG. 8 illustrates an elongated horizontal treatment vessel shown in cross-section and shows a multi-stage separator employing a heater in one section, electrostatic fields in a separate section to which a dual frequency voltage is applied as taught in this disclosure, a mechanical separation section utilizing inclined corrugated plate separators formed of material disposed downstream of the electrostatic separation section and a quiescent section providing for separated oil to flow over a wier and into an oil outlet.
Figure 10:
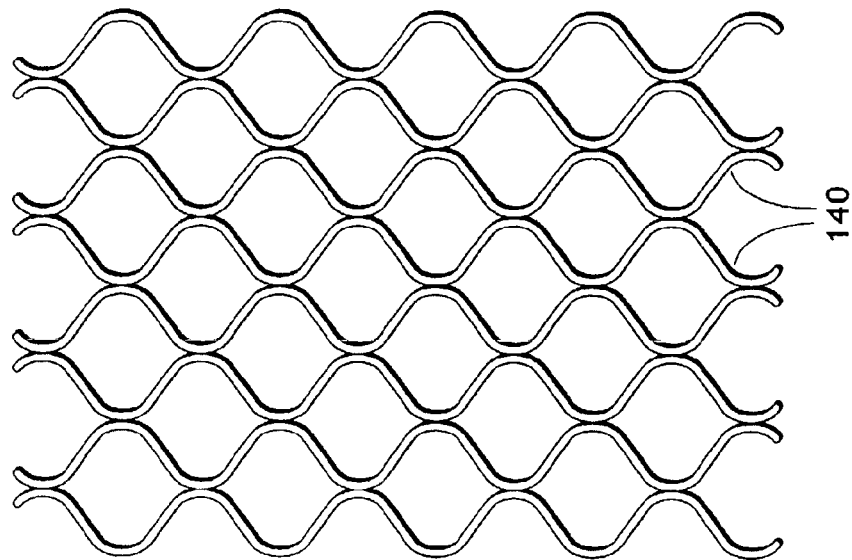
FIG. 10 is a reduced-dimensioned partial cross-sectional view showing adjacent sheets of corrugated non-conductive material as illustrated in FIG. 9.
Figure 9:
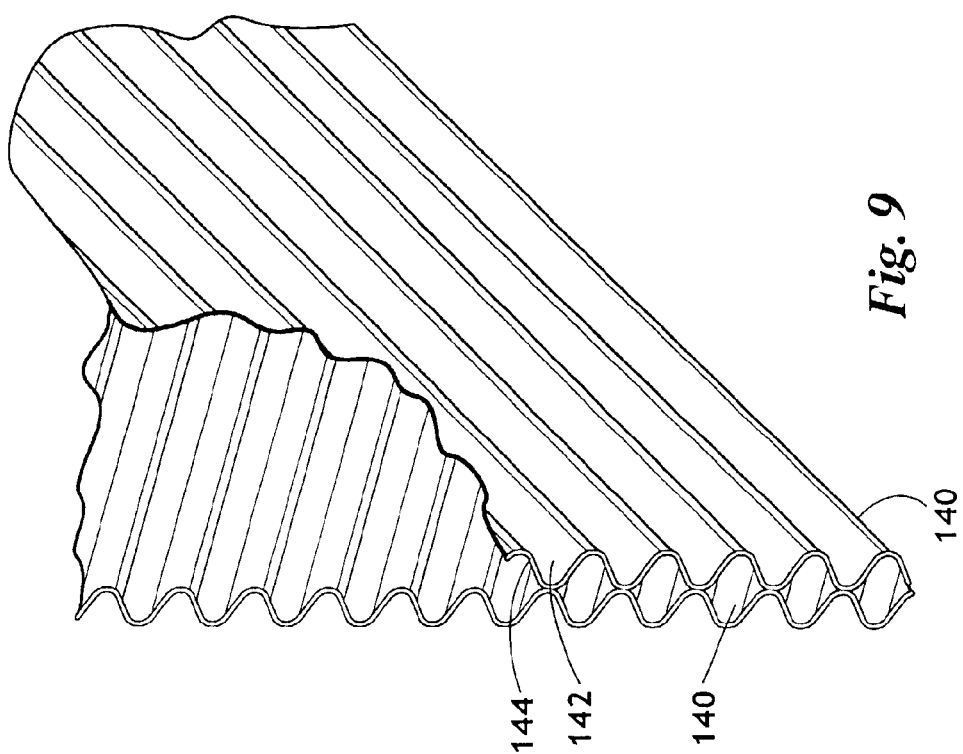
FIG. 9 is a detailed isometric view of the mechanical separation system employed in the third section of the separator vessel illustrated in FIG. 8 showing portions of adjacent sheets of corrugated material arranged adjacent to each other wherein the corrugations are at angles with respect to each other.

FIGS. 8, 9 and 10 illustrate an embodiment of the invention wherein dual frequency coalescence is employed in conjunction with other coalescing systems and particularly with systems that use other than electrostatic fields to augment coalescence. In FIG. 8 an elongated coalescence/separator vessel is indicated by numeral 10C and has an emulsion inlet 12, a water outlet 14, an oil outlet 16 and a gas outlet 22. Further, in commonality with FIG. 1 of this application, within vessel 10C there is an oil/water interface 18 and an oil level 20.

Centrally positioned between opposite ends of horizontal vessel 10C are alternating electrodes 76 and 78 that function in a manner described with reference to FIG. 3—that is, the parallel plates 76 and 78 form opposed pairs having spaces therebetween through which emulsion migrates. Dual frequency electrostatic fields are provided by voltage supplied by high voltage transformer 36 fed by circuitry provided by the basic component of rectifier 48, modulator 52 and chopper 56, all as previously described. Diodes 82 and 84 in series with conductors 86 and 88 create a dual frequency rectified voltage that is applied between the adjacent electrodes 76, 78 that is of a selected base frequency modulated in intensity at a frequency $F_2$ wherein $F_1$ is greater than $F_2$.

In addition to the electrostatic coalescence system utilizing dual frequency voltage described herein, the separator system of FIG. 8 has other systems to augment separation. A vertical wall 118 provides an inlet chamber 122 between it and a first end 120 of vessel 10C. Positioned in inlet chamber 122 is a heater 124. Heaters are frequently employed in oil/water separators since the separation of entrained water from an oil/water emulsion is enhanced by raising the temperature of the emulsion. Heat may be obtained from heater 124 in a variety of ways. If the separation vessel is relatively small and electric power is conveniently available and inexpensive, heater 124 may be powered by electrical energy. More commonly in the petroleum industry heater 124 is gas fired in which commonly available natural gas from producing formations is burned with air to provide the heat to raise the emulsion temperature. Heater 124 is diagrammatically illustrated in FIG. 8 since, as previously stated, such heaters are commonly employed and are well known to petroleum equipment manufacturers and petroleum engineers. The essence of the system of FIG. 8 is that a section 122 of the vessel is provided as an inlet section wherein the temperature is raised to augment separation. This is illustrative of the fact that the dual frequency coalescence and separation system of this invention may be synergistically employed with other standard coalescence and separation systems and techniques.

Emulsion passing from inlet chamber 122 passes over the top edge 126 or below bottom edge 128. Since bottom edge 128 is below the oil/water emulsion level 18, the essential movement from inlet chamber 122 past wall 118 is water flowing under bottom edge 128 and oil or oil rich emulsion flowing over top edge 126 into a second or electrostatic chamber 130 that has plates 76 and 78 therein and that functions as has been previously described with reference particularly to the embodiments of FIGS. 3, 4, 5 and 6. Electrostatic chamber 130 is formed between first vertical wall 118 and a second vertical wall 132 that extends downwardly from the vessel interior top. Emulsion flowing over the top edge 126 of wall 118 moves downwardly through the electrostatic field formed by plates 76 and 78 and passes underneath the lower edge 134 into a third chamber 136 within the vessel. Coalesced water droplets formed by the electrostatic field formed by electrodes 76 and 78 passes downwardly into the water in the bottom of the vessel collected below the oil/water interface 18. Within the third chamber 136 a relatively quiescence zone is established through which the emulsion, having much of the water already separated therefrom, migrates toward the right end 138 of vessel 10C. After passing from the third chamber 136, the emulsion migrates through a corrugated sheet area 138. Area 138 is composed of paralleled spaced apart corrugated sheets of plastic, fiberglass, metal or other suitable material that is both chemically and mechanically stable in hydrocarbon fluid. Each sheet making up the section 138 is mounted in such a way that the corrugations form an angle of between 30 degrees and 60 degrees with respect to the horizontal. The sheets are illustrated in FIGS. 9 and 10. FIG. 10 is a fragmentary vertical cross-sectional view of the corrugated sheets showing how they are spaced with respect to each other. The sheets are individually given the number 140 and in a preferred arrangement the sheets are all essentially identical and differ only in the angular relationship of the corrugation as they are arranged relative to each other. As seen in the fragmentary isometric view of FIG. 9, the sheets are made up of alternating valleys 142 and ridges 144. The valleys and ridges on each sheet are parallel to each other however the corrugation on adjacent sheets are crossed so that while the corrugations on one sheet rise in the general direction of fluid flow, the corrugations on adjacent sheets decline in the general direction of fluid flow.

The closely spaced apart corrugated sheets 140 provide large surface areas on which coalesced water droplets can adhere and as the droplets enlarge, they tend to flow downwardly on the inclined paths provided by the corrugations into the water below interface 18.

After passing through corrugated sheets section 138 the emulsion flows into a final zone or chamber 146 in the vessel that is a quiescent chamber in which turbulence is at a minimum to further enhance the separation of oil droplets downwardly and the rise of resulting oil from the emulsion upwardly.

A weir 148 having an upper edge 150 is placed in front of oil outlet 16. Oil rising to the surface flows over upper edge 150 and out through oil outlet 16.

The embodiment of the invention illustrated in FIGS. 8, 9 and 10 illustrate how the dual frequency coalescence system of this invention may be employed in conjunction with other non-electrostatic coalescence techniques to synergistically provide,for highly effective separation of water entrained in an oil emulsion.

A good example of the use of electrostatic separation in conjunction with other separation techniques is described in U.S. Pat. No. 4,581,120 entitled "Method and Apparatus for Separating Oilfield Emulsion", issued to Kerry L. Sublette.

The invention has been illustrated and described primarily as it relates to vessels in which an emulsion flows essentially vertically through one or more electric fields. However, the systems and methods employing dual frequency electrostatic coalescence as discussed in this document can be used equally as well in vessels in which emulsion flows horizontally. Electrodes may be placed parallel to each other to establish electric fields through which emulsion passes horizontally or foraminous vertical electrodes can be employed. U.S. Pat. No. 6,391,268 entitled "Energy-Saving Heavy Crude Oil Emulsion-Treating Apparatus" illustrates a type of horizontal vessel and treating system to which the principles of this invention could be applied.

Figure 11:
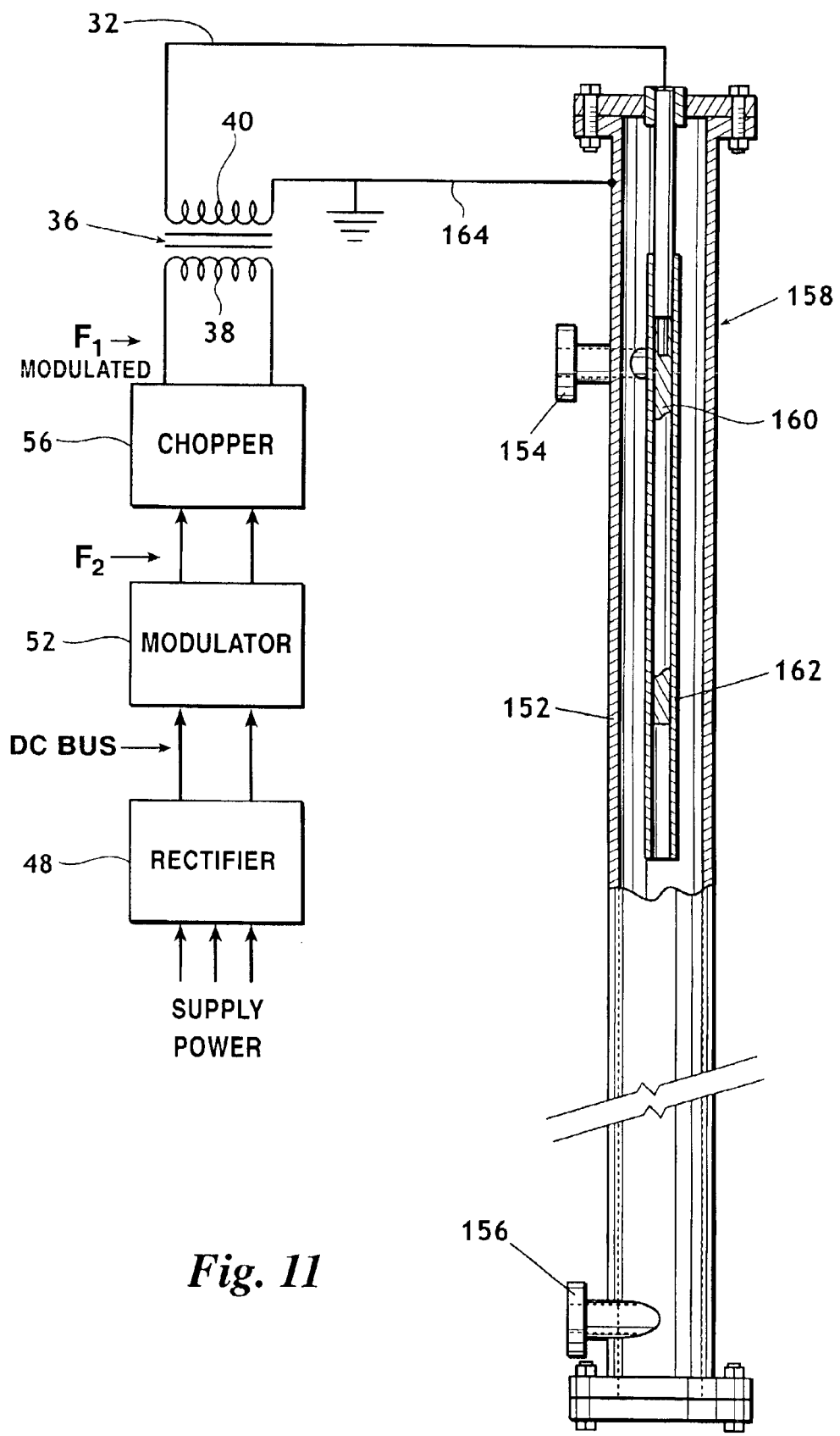
FIG. 11 is an elevational cross-sectional view of a vortex system employing dual frequency electrostatic coalescence for augmenting the separation of water in a water-in-oil emulsion. An electrode element in the system is shown partially in cross-section. The system employs the dual frequency concept of this disclosure.

As previously stated, the basic mechanism by which entrained water is separated out of an oil and water emulsion is by gravity. Coalescence augments gravitational separation by causing water droplets to coalesce—that is, adhere to each other to form larger water droplets that overcome the surface tension of surrounding oil and thereby allow the force of gravity to cause the water droplets to settle out of the emulsion. Gravity occurs naturally as a consequence of the earth's gravitational field but gravity can also be induced by circumferential flow—that is, by flowing an emulsion in a circular path or more specifically, in a spiral path. This technique is employed in centrifugal separators. The dual frequency coalescence system of this invention can be effectively employed in conjunction with centrifugal separation as illustrated in FIG. 11. An elongated cylindrical vessel 152 has, adjacent an upper end, an emulsion inlet 154 and adjacent a lower end an emulsion outlet 156. The system of FIG. 11 is illustrated purely as a coalescer, not a separator. Coalescers are frequently used in advance of a separator system—that is, separation can be enhanced by coalescence even when the coalescence is completed in a separate vessel.

Positioned centrally within cylindrical vessel 152 is an electrode, generally indicated by numeral 158, that essentially consists of two basic components—that is, a central conductive rod 160 surrounded by an insulator sleeve 162. Employing the dual frequency circuit as previously described, the output from high voltage transformer secondary 40 through conductor 32 supplies a high frequency voltage $F_1$ the intensity of the voltage being modulated at a frequency $F_2$. The other end of transformer secondary 40 is connected by conductor 164 to cylindrical vessel 152. Thereby, there is established an electric field within vessel 152 that varies in the manner illustrated in FIG. 2—that is, at a base frequency of $F_1$ modulated in intensity by a frequency $F_2$. As emulsion is centrifugally swirled within vessel 152 it is simultaneously subjected to the amplitude modulated base frequency $F_1$ to augment the separation of water from the oil/water emulsion. Water, being a heavier component, is impelled by centrifugal force to the exterior of the vessel while oil migrates to the interior. While both the oil and water exit through outlet 156, the components are substantially separated that is, the water components are in relatively large drops that can be more easily segregated from the oil component in a separation vessel. Therefore, FIG. 11 illustrates how the dual frequency electrostatic coalescence system of this invention can be employed in conjunction with a centrifugal separator.

U.S. Pat. No. 5,643,431 entitled "Method for Augmenting the Coalescence of Water in a Water-In-Oil Emulsion" issued to Gary W. Sams, et al., describes in detail a centrifugal system to augment separation of an emulsion similar to that illustrated in FIG. 11.

Figure 12:
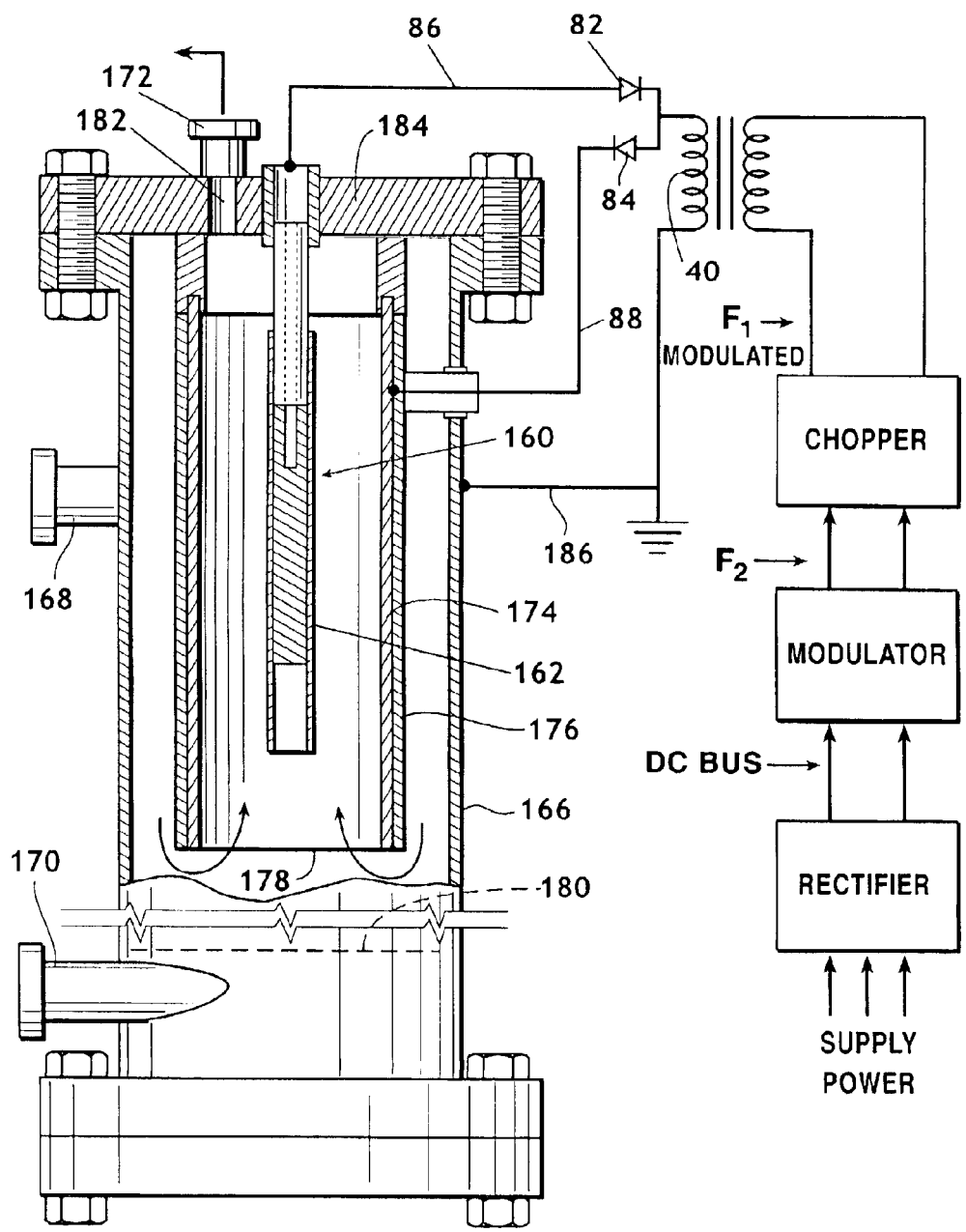
FIG. 12 is an elevational view of an apparatus for separating a water-in-oil emulsion using electrostatic coalescence and particularly using a dual frequency electrostatic coalescence system of this invention. In the embodiment of FIG. 12, coalescence is further augmented by the use of concentric electrodes and in which circumferential fluid flow paths are established so that centrifugal forces are applied to augment and enhance oil/water separation.

FIG. 12 is an illustration of the application of the principles of centrifugal separation as discussed with reference to FIG. 11, however FIG. 12 is a dual electrode centrifugal coalescer and separator. Emulsion enters vessel 166 through an inlet 168. Within the vessel, water is separated by electrostatically enhanced coalescence and centrifugal action to pass out of the vessel through outlet 170 while the oil, substantially free of water, passes out through an oil outlet 172 in the upper end of the vessel.

Vessel 166 is cylindrical and has an axial electrode 160 as has been described with respect to FIG. 11 and a tubular conductive electrode 174 that is surrounded on its outer cylindrical surface by an insulating sleeve 176.

Emulsion passes into vessel 166 through tangential emulsion inlet 168 and follows a circuitous, spiraled path round the exterior of tubular electrode 174. Centrifugal action forces water droplets entrained in the emulsion toward the outside of the vessel. At the lower end 178 of the tubular electrode 174 the emulsion reverses direction. Entrained water tends to flow downwardly into the lower portion of the vessel to an oil/emulsion interface 180. Ultimately the water is passed out through water outlet 170. The emulsion turns upwardly within the interior of tubular electrode 174 and migrates in the annular area between the outside of axial electrode 158 and the interior of cylindrical electrode 174 thus being subjected to a dual frequency electrostatic field. Water droplets are coalesced in the dual frequency electrostatic field, the water droplets falling downwardly out the lower end 178 of cylindrical electrode 174 and into the bottom of the vessel while the oil, or lighter weight content of the emulsion, migrates upwardly and passes through an opening 182 in a top plate 184. Opening 182 communicates with oil outlet 172.

By use of circuitry as has been described with reference to FIGS. 3, 4, 5, 6 and 8, conductor 86 is connected to conductive rod 160 and conductor 88 to tubular electrode 174. Further, one side of transformer secondary 40 is grounded to the wall of vessel 166 by means of conductor 186. Thereby there is an electric field established not only between axial electrode 160 and tubular electrode 174 but also an electric field between the tubular electrode 174 and the wall of cylindrical vessel 166. These dual frequency electric fields enhance the coalescence of oil in the oil/water emulsion.

U.S. Pat. No. 5,575,896 entitled "Method and Apparatus for Oil/Water Separation Using a Dual Electrode Centrifugal Coalescer", issued to Gary W. Sams et al., provides a detailed description of the use of a coalescer/separator vessel of the type shown in FIG. 12.

A conventional electrostatic coalescence process that utilizes a single frequency electrostatic field compared to the dual frequency electrostatic coalescence process of this disclosure has shown the following results:

| Electrostatic Process | Conventional | Dual Frequency |
| --- | --- | --- |
| Oil Flowrate, bopd | 50,000 | 50,000 |
| Water Content, % | 5 | 5 |
| Operating Pressure, bar | 7 | 7 |
| Operating Temperature, C. | 100 | 100 |
| Oil Specific Gravity | 0.93 | 0.93 |
| Oil Viscosity @ 100 C., cp | 8.9 | 8.9 |
| Water Specific Gravity | 1.015 | 1.015 |
| Vertical Oil velocity, m/hr | 8.75 | 8.75 |
| Stoke's Water Diameter, microns | 647 | 647 |
| Oil Conductivity, pS/m | 75,000 | 75,000 |
| Interfacial tension, dynes/cm | 15 | 15 |
| Base Frequency, F1, Hz | 60 | 1450 |
| Modulation Frequency, F2 Hz | — | 2.7 |
| Minimum voltage | — | 17,000 V RMS |
| Maximum voltage | — | 38,400 V RMS |
| Water in Effluent Oil, % | 0.5 | 0.2 |

While the end result, that is 0.2% versus 0.5% water in the effluent may not appear to be dramatic, this difference is highly significant in the operation of petroleum production and refinery processes.

As previously stated, the base frequency $F_1$ that is applied to electrodes of a treating vessel to enhance coalescence according to the principles of this invention is related to the conductivity of the emulsion expressed in pS/m. $F_1$ is preferably in the range of about 0.01 to 0.04 times conductivity of the emulsion in pS/m. In the illustrated example in which crude oil has a conductivity level, in pS/m, of 75,000, $F_1$ was selected to be 1450 Hz and thus the ratio is 0.0193, or about the middle of the preferred range. The modulating frequency $F_2$ is related to interfacial tension of the emulsion, and is preferably in the range of about 10 to 60 divided by interfacial tension expressed in dynes/cm. In the illustrated example wherein the crude oil interfacial tension was measured at 15 dynes/cm, the selected modulation frequency $F_2$ was 2.7 Hz giving a constant of 40, again about the middle of the preferred range.

In addition to selectably variable $F_1$ and $F_2$ of the dual frequency system, the designer of a treatment vessel to enhance coalescence of an emulsion must also determine the minimum and maximum modulation voltages. As previously stated, the maximum voltage is preferably about the emulsion critical voltage and thus should be in the range of about 0.8 to 1.2 times the calculated critical voltage which is preferably, when the emulsion is crude oil, about 255,000 times the square root of the emulsion interfacial tension expressed in dynes per cm divided by the water droplet diameter in microns. Using this relationship for the crude oil used in the example given by the table, the critical voltage was calculated to be 38,400 V RMS and this was selected to be the maximum voltage for $F_2$.

While it is theoretically possible to calculate the threshold voltage of an emulsion, as a practical matter it is best directly measured from a sample of the emulsion. For this reason, a user wishing to procure a treatment vessel to enhance coalescence of crude oil usually provides the designer with the threshold voltage of the emulsion, or supplies a sample and the designer determines the threshold voltage in a laboratory. The threshold voltage is the lowest voltage with sufficient energy to cause the water droplets in the emulsion to coalesce into larger sizes to settle out of the emulsion. In the dual frequency coalescence method taught herein the minimum voltage of a modulating signal $F_2$ should be in the range of about 0.8 to 1.2 times the measured threshold voltage. In the dual frequency method as taught the minimum voltage should not be lower than the threshold voltage for any substantial percentage of a cycle since coalescence is essentially stopped during such time, however, in some instances it may be desirable to set the minimum of $F_2$ slightly below the threshold voltage. In the illustrated arrangement, the crude oil being treated had a threshold voltage of 17,000 V RMS and this was selected as the minimum voltage of $F_2$.

Basic concepts regarding the use of AC electrostatic fields to enhance coalescence of water in an oil/water emulsion are described in U.S. Pat. Nos. 3,772,180 and 4,400,253, both issued to Prestridge, and U.S. Pat. No. 4,417,971 issued to Ferrin, et al.

The following U.S. Pat. Nos. are incorporated herein by reference: U.S. Pat. Nos. 6,010,634; 4,606,801; 4,702,815; 4,581,120; 5,643,431; 5,575,896; 3,772,180; 4,400,253 and 4,417,971.

The illustrations of the application of the dual frequency electrostatic coalescence methods and systems of this invention including those illustrated and described in combination with other separation techniques are given by way of example and not by limitation as the dual frequency electrostatic coalescence concepts including the systems and methods of this invention may be employed in other unique and useful combinations to achieve improved efficiency and effectiveness of the separation of heavier and lighter components of an emulsion.

The claims and the specifications describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

What is claimed is:

1. A method of augmenting the separation of immiscible heavier and lighter components of an emulsion comprising:
   conducting the emulsion into a treatment vessel;
   providing an AC voltage source of readily selectable frequencies;
   employing from said source an AC voltage of at least one selected frequency $F_1$ to establish at least one electric field within said vessel through which the emulsion passes; and
   modulating the intensity of said AC voltage at a selected frequency $F_2$ wherein $F_1$ is greater than $F_2$.

2. A method of augmenting the separation of immiscible heavier and lighter components of an emulsion according to claim 1 herein said intensity of said AC voltage is modulated in a format selected from the group comprising a sine wave, a square wave, a triangular shaped wave, a trapezoidal shaped wave, an exponentially shaped wave, a logarithmically wave, a semi-circular shaped wave, an inverse semi-circular shape wave, a symmetrically shaped wave and combinations thereof.

3. A method of augmenting the separation of immiscible heavier and lighter components of an emulsion according to claim 1 wherein said AC voltage is essentially a sine wave of selectable frequency $F_1$.

4. A method of augmenting the separation of immiscible heavier and lighter components of an emulsion according to claim 1 wherein said electric field is established in said vessel between spaced apart electrodes.

5. A method of augmenting the separation of immiscible heavier and lighter components of an emulsion according to claim 4 wherein one of said electrodes is at ground potential.

6. A method of augmenting the separation of immiscible heavier and lighter components of an emulsion according to claim 4 wherein said electrodes are formed essentially of non-conductive material.

7. A method of augmenting the separation of immiscible heavier and lighter components of an emulsion according to claim 6 wherein said electrodes are formed essentially of fiberglass reinforced plastic.

8. A method of augmenting the separation of immiscible heavier and lighter components of an emulsion according to claim 1 wherein said voltage potential modulation varies from a selected threshold voltage.

9. A method of augmenting the separation of immiscible heavier and lighter components of an emulsion according to claim 1 wherein $F_1$ and $F_2$ are separately selected in accordance with separate characteristics of said emulsion.

10. A method of augmenting the separation of immiscible heavier and lighter components of an emulsion according to claim 1 wherein $F_1$ is essentially determined by the conductivity of the emulsion.

11. A method of augmenting the separation of immiscible heavier and lighter components of an emulsion according to claim 1 wherein $F_2$ is essentially determined by droplet mass and/or the interfacial tension of the emulsion.

12. A method of augmenting the separation of immiscible heavier and lighter components of an emulsion according to claim 1 wherein $F_1$ is n the range of about 60 to 2500 Hz.

13. A method of augmenting the separation of immiscible heavier and lighter components of an emulsion according to claim 1 wherein $F_2$ is n the range of about 3 to about 100 Hz.

14. A method of augmenting the separation of immiscible heavier and lighter components of an emulsion according to claim 1 wherein said AC voltage potential is modulated in intensity asymmetrically at a frequency $F_2$.

15. A method of augmenting the separation of immiscible heavier and lighter components of an emulsion according to claim 1 wherein $F_1$ is in the range of about 0.01 to 0.04 times the conductivity of the emulsion expressed in pS/m.

16. A method of augmenting the separation of immiscible heavier and lighter components of an emulsion according to claim 1 wherein $F_2$ is in the range of about 10 to 60 divided by the interfacial tension of the emulsion expressed in dynes/em.

17. A method of augmenting the separation of immiscible heavier and lighter components of an emulsion according to claim 1 wherein the minimum voltage of $F_2$ is in the range of about 0.8 to 1.2 times the measure threshold voltage of the emulsion.

18. A method of augmenting the separation of immiscible heavier and lighter components of an emulsion according to claim 1 wherein the maximum voltage of $F_2$ is about 0.8 to 1.2 times the emulsion critical voltage where the critical voltage is about 255,000 times the square root of the emulsion interfacial tension in dynes per cm divided by the water droplet diameter in micros.

19. A method of augmenting the separation of immiscible heavier and lighter components of an emulsion according to claim 1, including after said emulsion has passed through said electric field of passing said emulsion through a plurality of spaced apart, corrugated plates oriented substantially parallel to the emulsion flow.

20. A method of desalting a liquid hydrocarbon comprising:
   providing an AC voltage source of readily selectable frequency:
   flowing salty hydrocarbon into a portion of a vessel;
   providing a plurality of substantially paralleled spaced apart electrodes within said vessel;

in response to the characteristics of the liquid hydrocarbon, selecting from said AC voltage source a selected frequency $F_1$;

applying said selected frequency $F_1$ to said electrodes to thereby establish an electric field between adjacent electrodes, and modulating said selected frequency in amplitude at frequency $F_2$ where $F_1$ is greater than $F_2$;

conducting said salty hydrocarbon between adjacent of said electrodes;

flowing fresh water into said vessel between adjacent said electrodes counter current to the flow of said hydrocarbon;

withdrawing water from a portion of said vessel; and withdrawing reduced salty hydrocarbon from a portion of said vessel.

21. A method of augmenting the separation of immiscible heavier and lighter components of an emulsion comprising:

providing an AC voltage source of readily selectable frequency;

introducing the emulsion into at least one distribution conduit submerged within liquid within an interior of a vessel;

passing emulsion within each said distribution conduit into aid vessel through a plurality of small dimensioned openings to provide a plurality of small streams;

rapidly attenuating the momentum of said small streams passing into said vessel from said small dimensioned openings to substantially dissipate kinetic energies thereof and to thereby provide substantially turbulence free emulsion movement in said vessel;

selecting from said AC voltage source a selected frequency $F_1$;

establishing at least one electric field within said vessel employing said AC voltage source of frequency $F_1$:

modulating the amplitude of said electric field at a frequency $F_2$ where $F_1$ is greater than $F_2$.

22. A method of augmenting the coalescence of water in an emulsion having a water component that is relatively electrically conductive and an oil component that is relatively non-conductive comprising:

providing an AC voltage source of readily selectable frequency;

tangentially injecting the emulsion into the interior of an electrically conductive cylindrical vessel having an cylindrical sidewall, opposed first and second ends and a vessel cylindrical axis and tangentially withdrawing the emulsion from the vessel interior to cause the emulsion to flow circumferentially within the vessel around the vessel cylindrical axis to thereby impart by the force of fluid flow alone, centrifugal force on the emulsion to create a first area within the vessel adjacent the vessel sidewall to which a heavier component of the emulsion migrates and a second area within the vessel interior adjacent to the vessel cylindrical axis toward which a lighter component migrates;

selecting from said AC voltage source a selected frequency $F_1$;

imposing said AC voltage of selected frequency between an elongated conductive central electrode of external diameter less than the internal diameter of the vessel and said cylindrical sidewall, the central electrode extending concentrically along the vessel cylindrical axis;

and modulating the amplitude of said AC voltage source of frequency $F_1$ at a frequency $F_2$ wherein $F_1$ is greater than $F_2$ to cause at least a portion of the water component of the emulsion to coalescence.

23. A method of coalescing water in a water/oil emulsion comprising:

providing an AC voltage source of readily selectable frequency;

passing the emulsion into a vessel in which water is maintained in a lower portion thereof at a preselected water level, the water serving as electrical ground potential;

providing spaced apart electrodes in the vessel above said water level;

passing the emulsion upwardly between said electrodes;

selecting from said AC voltage source a selected frequency $F_1$;

rectifying said AC voltage of frequency $F_1$ to obtain a rectified voltage source of a first polarity that is applied to one of said electrodes;

half wave rectifying said AC voltage of frequency $F_1$ to obtain a rectified voltage potential of the opposite polarity that is applied to the other of said electrodes, the voltage potential applied between said electrodes and said water ground potential thereby varying at a frequency $F_1$;

modulating in amplitude said selected AC voltage of frequency $F_1$ at a frequency $F_2$ where $F_1$ is greater than $F_2$;

withdrawing water from said vessel lower portion as required to maintain said water level; and withdrawing emulsion having a reduced water content from an upper portion of said vessel.

24. A method of augmenting the coalescence of water in a water-in-oil emulsion comprising:

providing an AC voltage source of readily selectable frequency;

tangentially injecting the emulsion into a cylindrically walled electrically conductive vessel having a cylindrical interior surface and opposed ends to cause the emulsion to flow circumferentially within the vessel around the exterior of a substantially cylindrical tubular electrode extending concentrically within said vessel to thereby cause a heavier component of the emulsion to migrate toward the vessel's cylindrical exterior surface and to maintain a higher percentage of a lighter component within the vessel interior;

thereafter passing said emulsion axially through an annular area between the interior of said tubular electrode and the exterior of an elongated central electrode extending concentrically within said tubular electrode, the vessel, the tubular electrode and the central electrode being electrically insulate from each other, the emulsion flowing to an outlet within said tubular electrode;

selecting from said AC voltage source a selected frequency $F_1$;

rectifying said selected AC voltage of frequency $F_1$ to obtain a first half wave rectified voltage of a first polarity and frequency $F_1$;

applying said half wave rectified voltage of a first polarity and frequency $F_1$ between said vessel and said tubular electrode;

rectifying said selected AC voltage of frequency $F_1$ to obtain half wave rectified voltage of an opposite polarity and frequency $F_1$; and applying said half wave rectified voltage of an opposite polarity between said tubular electrode and said central electrode, said AC voltage of selected frequency $F_1$ being modulated in amplitude at a frequency $F_2$ where $F_1$ is greater than $F_2$.

25. A method of augmenting the separation of immiscible heavier and lighter components of an emulsion comprising:

providing an AC voltage source of readily selectable frequency;

determining the threshold voltage of the emulsion;

conducting the emulsion into a treatment vessel;

selecting from said AC voltage source a selected frequency $F_1$;

employing said AC voltage of selected frequency $F_1$ to establish at least one electric field within said vessel through which the emulsion passes; and modulating the intensity of said selected AC voltage at a frequency $F_2$ wherein $F_1$ is greater than $F_2$ and wherein the minimum voltage is about 0.8 to 1.2 times the determined threshold voltage.

26. A method of augmenting the separation of immiscible heavier and lighter components of an emulsion comprising:

providing an AC voltage source of readily selectable frequency;

determining at least some of the physical characteristics of the emulsion;

conducting the emulsion into a treatment vessel;

selecting from said AC voltage source a selected frequency $F_1$ to establish at least one electric field within said vessel through which the emulsion passes; and modulating the amplitude of said AC voltage of selected frequency $F_1$ at a selected frequency $F_2$ wherein $F_1$ is greater than $F_2$ and wherein $F_1$ and $F_2$ are separately selected in accordance with determined emulsion physical characteristics.

27. A method of augmenting the separation of immiscible heavier and lighter components of a conductive emulsion comprising:

providing an AC voltage source of readily selectable frequency;

passing the emulsion into a treatment vessel, employing an AC voltage from said source of selected frequency $F_1$ to establish at least one electric field within said vessel through which the emulsion passes, $F_1$ being selected according to the emulsion conductivity; and modulating the intensity of said AC voltage at a selected frequency $F_2$ wherein $F_1$ is greater than $F_2$.

28. A method of augmenting the separation of immiscible heavier and lighter components of an emulsion having droplets of variable mass, comprising;

providing an AC voltage source of readily selectable frequency;

conducting the emulsion into a treatment vessel;

selecting from said AC voltage source a selected frequency $F_1$;

employing said selected voltage of frequency $F_1$ to establish at least one electric field within said vessel through which the emulsion passes; and modulating the intensity of said selected voltage source of frequency $F_1$ at a selected frequency $F_2$ wherein $F_1$ is greater than $F_2$, and wherein $F_2$ is selected to attain effective growth of droplet mass.

29. A method of augmenting the separating of immiscible heavier and lighter components of an emulsion having droplets of variable mass according to claim 28 wherein F2 is selected to attain effective growth of droplet mass above the Stokes diameter.

30. A method of augmenting the separation of immiscible heavier and lighter components of an emulsion comprising:

providing an AC voltage source of readily selectable frequency;

measuring the interfacial tension of the emulsion;

conducting the emulsion into a treatment vessel;

selecting AC voltage of frequency $F_1$ from said AC voltage to establish at least one electric field within said vessel through which the emulsion passes; and modulating the intensity of said AC voltage of frequency $F_1$ at a selected frequency $F_2$ wherein $F_1$ is greater than $F_2$, and wherein $F_2$ is determined essentially by the measured interfacial tension.

* * * * *